(12) United States Patent
Yamamoto et al.

(10) Patent No.: US 8,073,939 B2
(45) Date of Patent: *Dec. 6, 2011

(54) LICENSE INFORMATION EXCHANGE SYSTEM

(75) Inventors: Masaya Yamamoto, Hirakata (JP); Masahiro Oho, Neyagawa (JP); Kouji Miura, Matsubara (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/892,105

(22) Filed: Aug. 20, 2007

(65) Prior Publication Data

US 2008/0010371 A1   Jan. 10, 2008

Related U.S. Application Data

(62) Division of application No. 10/354,080, filed on Jan. 30, 2003, now Pat. No. 7,290,047.

(30) Foreign Application Priority Data

Feb. 1, 2002   (JP) .................................. 2002-025121

(51) Int. Cl.
*G06F 15/173* (2006.01)
(52) U.S. Cl. ........ 709/223; 709/203; 709/224; 709/225; 709/227
(58) Field of Classification Search .................. 709/203, 709/223, 224, 225
See application file for complete search history.

(56) References Cited

U.S. PATENT DOCUMENTS

| | | | | |
|---|---|---|---|---|
| 5,790,664 A * | 8/1998 | Coley et al. | .................. | 709/203 |
| 5,982,293 A | 11/1999 | Everett et al. | | |
| 6,056,786 A * | 5/2000 | Rivera et al. | .................. | 717/168 |
| 6,073,124 A | 6/2000 | Krishnan et al. | | |
| 6,708,157 B2 * | 3/2004 | Stefik et al. | ...................... | 705/59 |
| 6,954,877 B2 * | 10/2005 | Earl et al. | ......................... | 714/13 |
| 6,968,384 B1 * | 11/2005 | Redding et al. | .............. | 709/229 |
| 7,092,953 B1 * | 8/2006 | Haynes | ........................... | 705/51 |
| 2001/0011254 A1 * | 8/2001 | Clark | ............................... | 705/59 |
| 2002/0107806 A1 * | 8/2002 | Higashi et al. | .................... | 705/51 |
| 2002/0107809 A1 * | 8/2002 | Biddle et al. | .................... | 705/59 |
| 2003/0037006 A1 * | 2/2003 | Maruyama et al. | ............. | 705/59 |
| 2003/0115069 A1 * | 6/2003 | Pence et al. | ....................... | 705/1 |
| 2004/0203741 A1 | 10/2004 | Hori et al. | | |

FOREIGN PATENT DOCUMENTS

| | | |
|---|---|---|
| EP | 0 332 304 | 9/1989 |
| EP | 1 204 054 | 5/2002 |
| JP | 05-265959 | 10/1993 |
| JP | 06-225111 | 8/1994 |
| JP | 9-146824 | 6/1997 |
| JP | 10-133971 | 5/1998 |
| JP | 11-505348 | 5/1999 |
| JP | 2002-24092 | 1/2002 |
| JP | 2002-73191 | 3/2002 |
| JP | 2002-251524 | 9/2002 |
| JP | 2002-334173 | 11/2002 |
| WO | 00 58811 | 10/2000 |

* cited by examiner

*Primary Examiner* — Kamal B Divecha
*Assistant Examiner* — Dhairya A Patel
(74) *Attorney, Agent, or Firm* — Wenderoth, Lind & Ponack, L.L.P.

(57) ABSTRACT

When license information is transferred between a server machine and a client machine, an identifier which is unique to a series of communication sequences is provided. The identifier is sent when a communication is performed between the two machines, as well as when the license information is updated. Therefore, when a message for transferring the license information is received by the use of the same identifier, a response message is returned without updating the license information.

3 Claims, 23 Drawing Sheets

Fig. 4

| Client ID information | Content ID information | Usage number information | Usage expiring date information |
|---|---|---|---|
| CLIENTS-ID-11111 | CONTENTS-ID-1111 | 10 | ~2002/3/31 |
| CLIENTS-ID-11111 | CONTENTS-ID-2222 | 3 | ∞ |
| CLIENTS-ID-11111 | CONTENTS-ID-3333 | ∞ | ~2002/1/31 |
| CLIENTS-ID-22222 | CONTENTS-ID-1111 | 1 | ~2002/3/31 |
| CLIENTS-ID-22222 | CONTENTS-ID-3333 | 5 | ~2002/12/31 |

Fig. 5

| Content ID information | Usage number information | Usage expiring date information |
|---|---|---|
| CONTENTS-ID-1111 | 5 | ~2002/3/31 |
| CONTENTS-ID-1111 | 1 | ∞ |

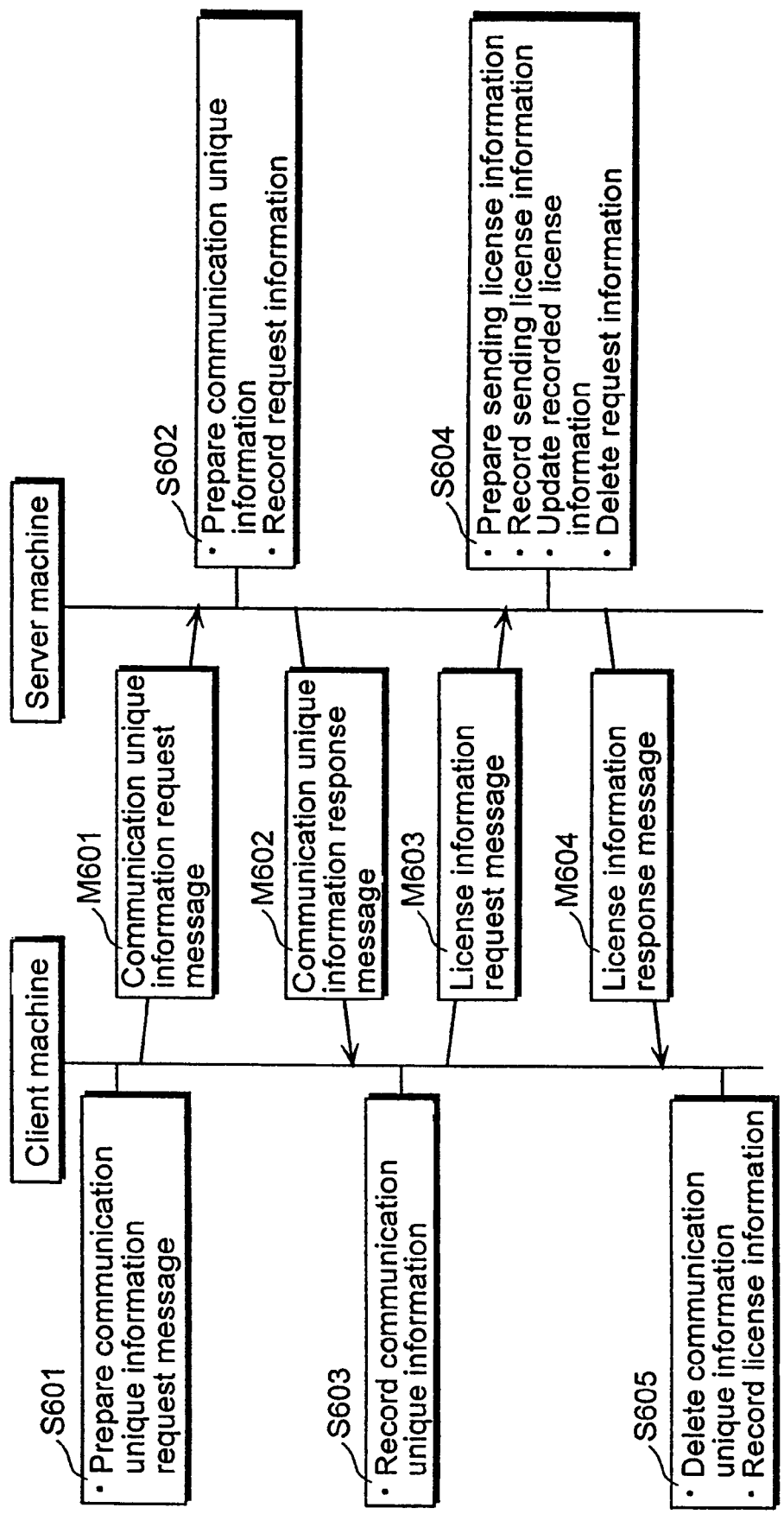

Fig. 7A

| Message ID | Message size | Client ID information | Usage number information | Content ID information |
|---|---|---|---|---|
| 0x0101 | 0x00000022 | CLIENTS-ID-11111 | 0x0005 | CONTENTS-ID-1111 |

Fig. 7B

| Message ID | Message size | Status code | Communication unique information |
|---|---|---|---|
| 0x0102 | 0x00000012 | 0x0000 | MESSAGE-ID-11111 |

Fig. 7C

| Message ID | Message size | Client ID information | Communication unique information |
|---|---|---|---|
| 0x0103 | 0x00000020 | CLIENTS-ID-11111 | MESSAGE-ID-11111 |

Fig. 7D

| Message ID | Message size | Status code | Usage number information | Usage expiring date information | Content ID information |
|---|---|---|---|---|---|
| 0x0104 | 0x00000018 | 0x0000 | 0x0005 | 0x07d2031F | CONTENTS-ID-1111 |

Fig. 8

| Communication unique information | Client ID information | Usage number information | Content ID information |
|---|---|---|---|
| MESSAGE-ID-11111 | CLIENTS-ID-11111 | 0x0005 | CONTENTS-ID-1111 |

Fig. 9

| Communication unique information | Client ID information | Usage number information | Usage expiring date information | Content ID information |
|---|---|---|---|---|
| MESSAGE-ID-11111 | CLIENTS-ID-11111 | 0x0005 | 0x07d2031F | CONTENTS-ID-1111 |

Fig. 12

| Message ID | Message size | Client ID information |
|---|---|---|
| 0x0201 | 0x00000010 | CLIENTS-ID-11111 |

Fig. 13A

| Message ID | Message size | Client ID information | Communication unique information |
|---|---|---|---|
| 0x0301 | 0x00000020 | CLIENTS-ID-11111 | MESSAGE-ID-11111 |

Fig. 13B

| Message ID | Message size | Status code |
|---|---|---|
| 0x0302 | 0x00000002 | 0x0000 |

LICENSE INFORMATION EXCHANGE SYSTEM

This application is a divisional application of Ser. No. 10/354,080, filed Jan. 30, 2003 now U.S. Pat. No. 7,290,047.

TECHNICAL FIELD

The present invention relates to a method for exchanging license information in a server-client type license information exchange system connected via a communication channel, and more particularly to a method for reducing the communication load when license information is exchanged.

BACKGROUND ART

With the development in networks, there are many electronic commerce systems to conduct commercial transactions through networks. In such a commerce system, a certain sort of valuable information such as cash is exchanged between machines on both ends engaged in a communication. Meanwhile, in recent years, a content usage right exchanged between machines in a content distribution system in which contents other than cash are distributed electronically has been witnessed.

In such a license information exchange system between machines, processing to be performed in the event of communication failure is a problem to be tackled, for license information is not to be subjected to unauthorized duplication or loss.

As a conventional license information exchange system with robustness against communication failure, there is a method disclosed in the Mondex patent (U.S. Pat. No. 5,982,293) in which the contents of a communication carried out between machines is recorded as a log so as to restore the exchange procedure of license information in the event of communication failure. Effective when license information is exchanged between two electronic purses, this method has a serious problem when used for a server-client type license information exchange system in which a number of client machines are connected to a single server.

This is because the server needs to communicate with a number of client machines at a time, leading to a highly increased size of the log data, as well as because a server-client communication is far more vulnerable than a communication between electronic purses, which consequently results in a higher occurrence rate of communication failure.

In order to solve these problems, the present invention aims at providing a license information exchange system capable of exchanging license information correctly in a server-client communication for exchanging license information such as content usage license information, even if communication failure occurs in the middle of such communication.

The present invention further aims at providing a license information exchange system capable of reducing the processing load on a license information exchange communication by reducing the number of communications carried out between a server and a client machine, and the number of data writings to a storage device of a server/client machine.

SUMMARY OF INVENTION

The present invention aims at providing a license information exchange system which is characterized by that no loss or duplication of license information occurs at the time of communication failure in a server-client type license information exchange system.

In order to solve the above problems, the license information exchange system according to the present information is a license information exchange system to exchange license information indicating details of a right between a first device which is a server device and a second device which is a client device via a communication network, the license information exchange system comprising the first device and the second device, wherein the first device includes: a communication unique information generating unit operable to generate communication unique information for identifying a license information exchange communication carried out with the second device; a first data storing unit operable to hold data exchanged in the course of the communication; and a first communication unit operable to perform a communication with the second device, and the second device includes: a second data storing unit operable to hold the data exchanged in the course of the communication; and a second communication unit operable to perform a communication with the first device, and the second device records at least client unique information for identifying the second device, and sends the client unique information to the first device through the second communication unit, the first device generates the communication unique information through the communication unique information generating unit when receiving the client unique information through the first communication unit, stores the client unique information and the communication unique information as a set in the first data storing unit, and sends the communication unique information to the second device through the first communication unit, the second device stores the communication unique information in the second data storing unit when receiving the communication unique information through the second communication unit, and sends at least the client unique information and the communication unique information to the first device when performing a communication for exchanging the license information, and the first device updates the license information stored in the first data storing unit being associated with the set of the client unique information and the communication unique information stored in the first data storing unit when the license information is sent/received from the second device.

Furthermore, in order to solve the above problems, in the license information exchange system according to the present invention, the second device further includes a request information generating unit operable to generate request information concerning the license information requested to be acquired, wherein the request information generating unit generates the request information concerning the license information which the first device requires, and sends the client unique information and the request information to the first device through the second communication unit, the first device generates the communication unique information through the communication unique information generating unit, when receiving the client unique information and the request information through the first communication unit, stores the client unique information, the communication unique information and the request information as a set in the first data storing unit, and further sends the communication unique information to the second device through the first communication unit, the second device stores the communication unique information in the second data storing unit, when receiving the communication unique information through the second communication unit, and sends at least the client unique information and the communication unique information to the first device, the first device further includes a license information generating unit operable to generate the license information according to the request information, and searches for the request information stored in the first data storing unit based on the client unique information and the communication unique information, when receiving the client unique information and the communication unique information through the first communication unit, has the license information generating unit generate sending license information sent to the second device based on the searched request information, and sends the sending license information to the second device through the second communication unit.

Note that the present invention is realized not only as the above-described license information exchange system but also as a license information exchange method in which units of the license information exchange system serve as steps, and as a license information exchange device in which such units are realized.

Moreover, it should be also understood that it is possible to implement the present invention as a program to realize the license information exchange method in a computer and the like as well as to distribute the program via a storage medium including a CD-ROM and via a transmission medium including a communication network.

As described hereinbefore, with the license information exchange system according to the present invention, when the server device and the client device exchange license information via a network, it is possible to avoid duplication or loss of the license information in the event of communication failure by managing an intermediate state of the communication on the part of the server device using the client ID information and the communication unique information.

Furthermore, with the license information exchange system according to the present invention, while robustness against communication failure is available as mentioned above, the client device needs to record only the client ID information and the communication unique information, realizing a comparably easy implementation of the system. Moreover, not only is it possible for the user of the client device to resume a communication interrupted when communication failure occurs, the user can also cancel the acquisition of the license information.

What is more, with the license information exchange system according to the present invention, by generating the restart ID, the client device does not have to make a request of the server device for issuing the restart ID, resulting in a decreased number of communications in a series of communication sequences.

Moreover, with the license information exchange system according to the present invention, by having the user of the client device in trouble with the license information exchange send to the server device the cancellation message including the restart ID, it is possible to reupdate the once-updated server management license information to the original state, so that it will never be updated wrongly.

Furthermore, with the license information exchange system according to the present invention, since the client device deletes the restart ID-related record when receiving the issued license information, it is possible to delete unnecessary information of the restart ID at the earliest stage. Moreover, by performing a batch commit without specifying any restart ID, it is also possible for the client device to reduce the amount of communication processing and therefore, to perform an efficient communication.

What is more, with the license information exchange system according to the present invention, by limiting the number of communication sequences to be performed at a time between specified devices to one, only a client ID is required as an identifier and therefore, the issue and the recording of the restart ID can be omitted.

Moreover, the present invention can provide a license information exchange system realizing a communication of an increased efficiency by reducing the number of writings to a data storage device as well as the number of communications in the license information exchange system.

Japanese patent application Ser. No. 2002-025121 filed Feb. 1, 2002 is incorporated herein by reference.

BRIEF DESCRIPTION OF DRAWINGS

These and other objects, advantages and features of the invention will become apparent from the following description thereof taken in conjunction with the accompanying drawings that illustrate specific embodiments of the invention. In the drawings:

FIG. 4 is a diagram showing a data configuration of license information managed by the server machine according to the first embodiment.

FIG. 5 is a diagram showing a data configuration of license information managed by the client machine according to the first embodiment.

FIG. 6 is a communication sequence diagram showing a procedure of how license information is transferred from the server machine to the client machine according to the first embodiment.

FIG. 7A is a diagram showing a data configuration of a communication unique information request message according to the first embodiment.

FIG. 7B is a diagram showing a data configuration of a communication unique information response message according to the first embodiment.

FIG. 7C is a diagram showing a data configuration of a license information request message according to the first embodiment.

FIG. 7D is a diagram showing a data configuration of a license information response message according to the first embodiment.

FIG. 8 is a diagram showing a data configuration of request information according to the first embodiment.

FIG. 9 is a diagram showing a data configuration of sending license information according to the first embodiment.

FIG. 12 is a diagram showing a data configuration of a commit message according to the first embodiment.

FIG. 13A is a diagram showing a data configuration of a cancellation request message according to the first embodiment.

FIG. 13B is a diagram showing a data configuration of a cancellation response message according to the first embodiment.

BEST MODE FOR CARRYING OUT THE INVENTION

The following is an explanation of embodiments of the present invention given with reference to FIGS. 1~23. An example is provided for the case where the present invention is applied to a server-client type content distribution system. License information in a content distribution system is equivalent to content usage right information.

The First Embodiment

Figure 1:
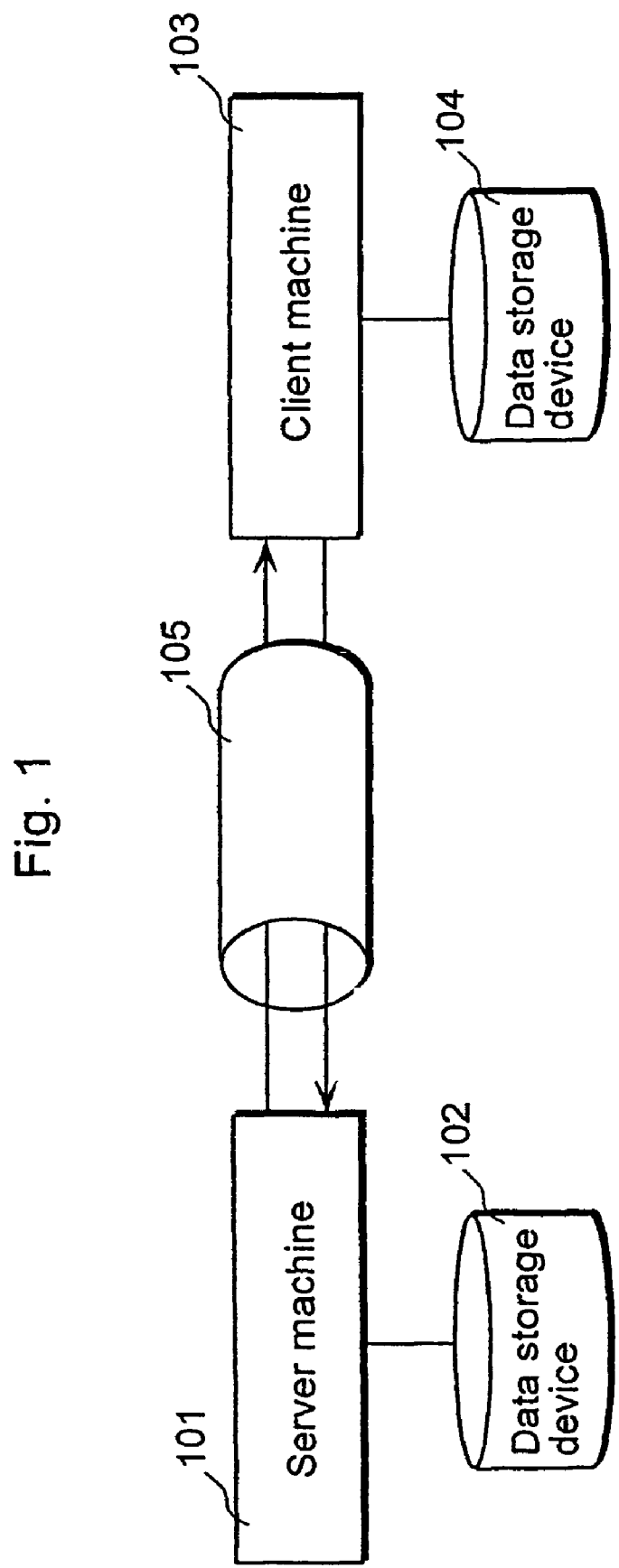
FIG. 1 is a diagram showing a configuration of a license information exchange system according to the first embodiment.

FIG. 1 is a diagram showing the configuration of a license information exchange system according to the first embodiment.

The license information exchange system according to the first embodiment comprises a server machine 101, a data storage device 102 managed by the server machine 101, a client machine 103, and a data storage device 104 managed by the client machine 103. The server machine 101 and the client machine 103 are connected via a network 105.

Figure 2:
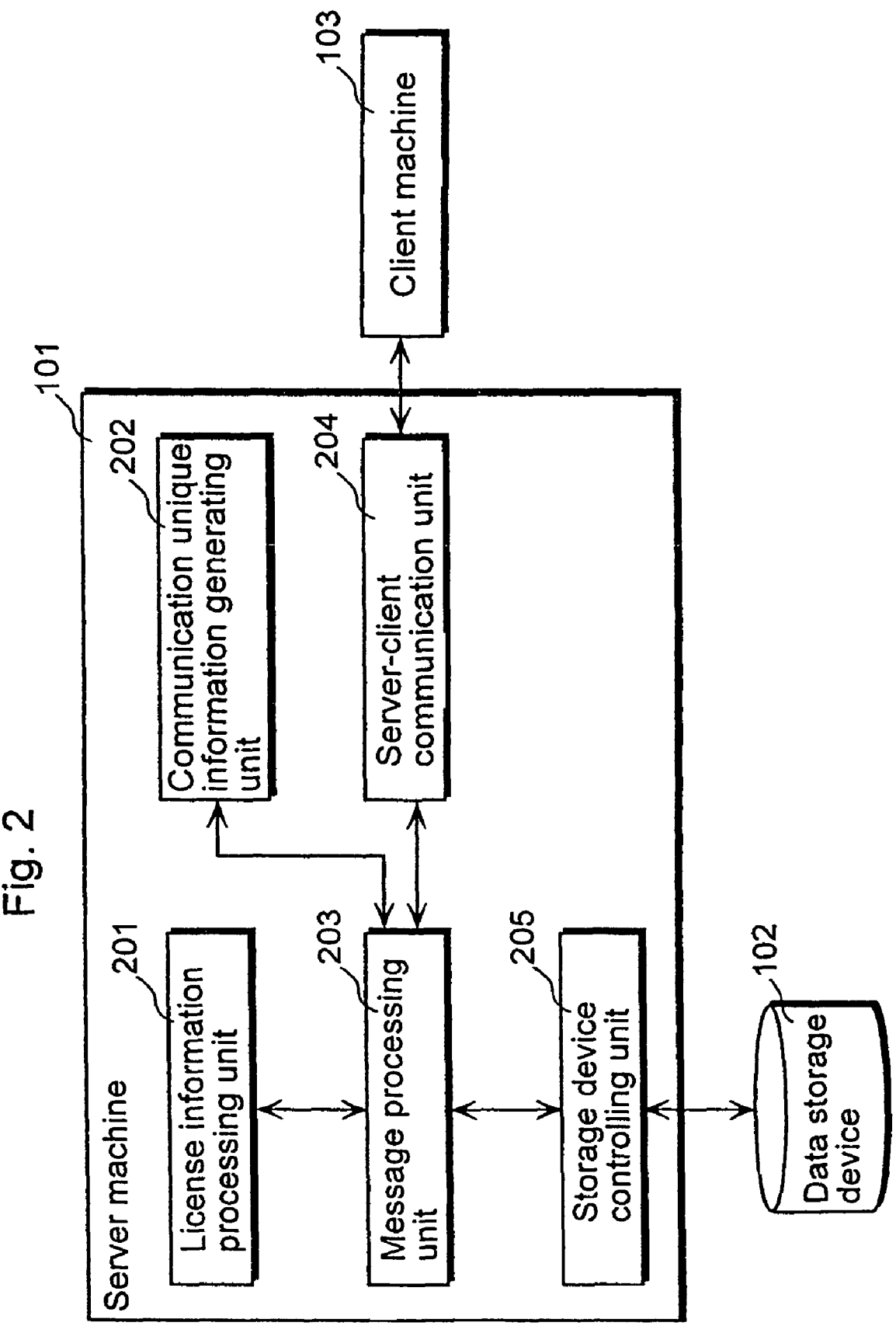
FIG. 2 is a diagram showing an internal configuration of a server machine according to the first embodiment.

FIG. 2 is a diagram showing the internal configuration of the server machine 101 according to the present embodiment.

The server machine 101 comprises a license information processing unit 201, a communication unique information generating unit 202, a message processing unit 203, a server-client communication unit 204, and a storage device controlling unit 205. The storage device controlling unit 205 is connected to the data storage device 102.

The license information processing unit 201 is a processing unit which draws out license information from the data storage device 102 and updates such license information according to a user request described in a message received from the client machine 103. For example, when contents requested by the user of the client machine 103 can be played three times, the server machine 101 makes a reference to the data storage device 102 using a client ID and a content ID, and when the user owns the right to play contents ten times, license information which allows the playback of three times is sent to the user and the remaining content playable number stored in the data storage device 102 is updated to seven.

The communication unique information generating unit 202 generates communication unique information which is requested by the client machine 103 to be issued. This communication unique information serves as a unique identifier for a series of communication sequences to be performed concurrently between the server machine 101 and the client machine 103. In other words, until receiving an acknowledgment of the completion of the communication sequences from the client machine 103, the server machine 101 does not issue the same communication unique information as the one issued for these communication sequences. However, it is possible to reissue once-used communication unique information after the completion of such series of communication sequences.

The message processing unit 203 processes and interprets a message received from the client machine 103 and gives each unit of the server machine 101 an instruction concerning the received message.

The server-client communication unit 204 is a processing unit represented by TCP/IP library, an LAN card and so forth, which performs message sending/receiving between the client machine 103 via network communications.

At the instruction from the message processing unit 203, the storage device controlling unit 205 searches for license information corresponding to the client machine 103 from among license information stored in the data storage device 102 to perform processing including update and modification of the searched license information.

The data storage device 102 is a database that holds such information as content usage rules purchased and acquired by the user of the client machine 103. Secure flash memory is an example of such data storage device 102.

Figure 3:
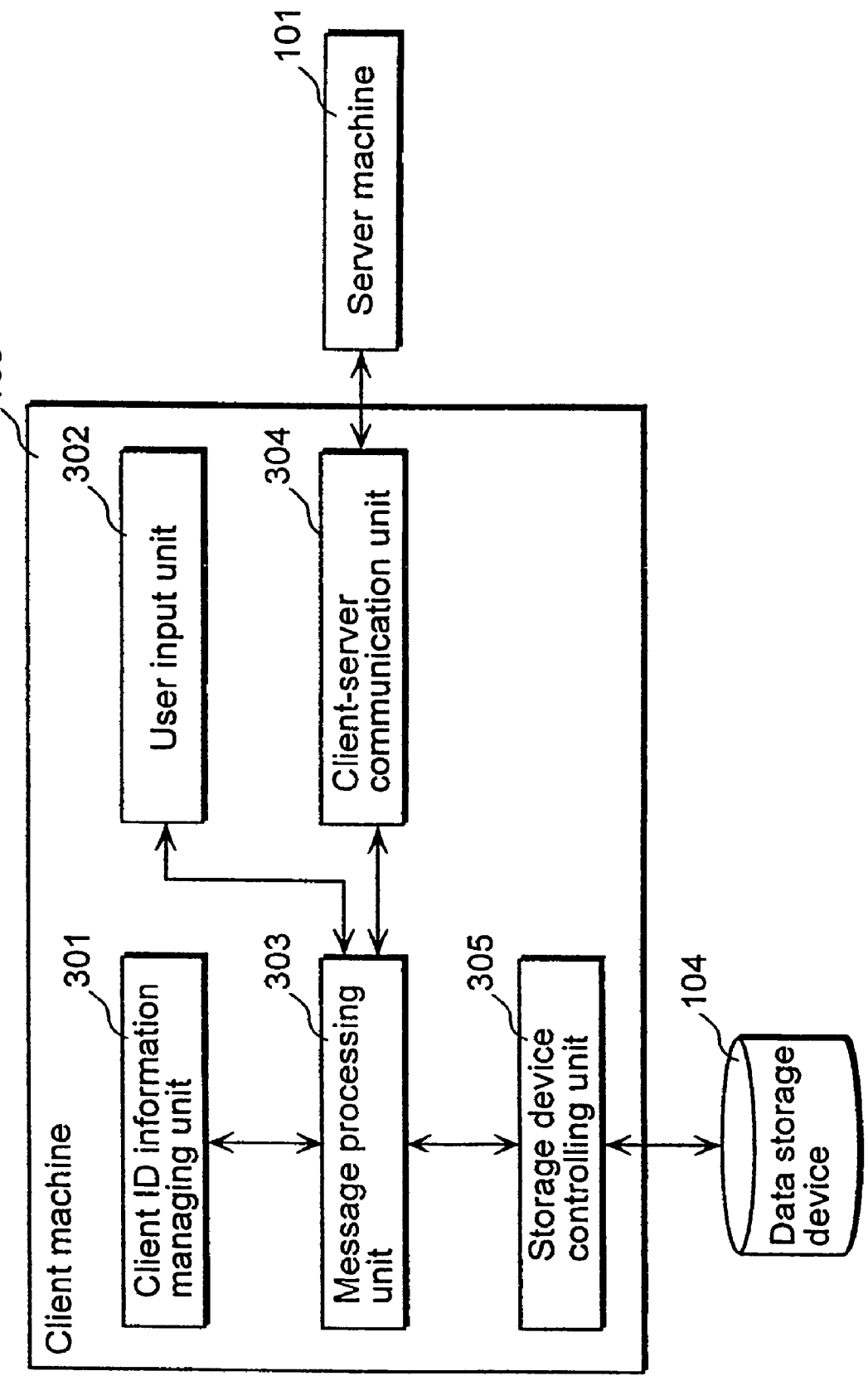
FIG. 3 is a diagram showing an internal configuration of a client machine according to the first embodiment.

FIG. 3 is a diagram showing the internal configuration of the client machine 103 according to the first embodiment. The client machine 103 comprises a client ID information managing unit 301, a user input unit 302, a message processing unit 303, a client-server communication unit 304, and a storage device controlling unit 305.

The client ID information managing unit 301 manages such restart information as a client ID which is a client identifier stored on ROM and others, an SSL encryption key and so forth.

The user input unit 302 can be a keyboard or the like of the client machine 103 such as a PC. The user of the client machine 103 inputs information s/he requests via the user input unit 302.

The message processing unit 303 prepares a message which includes communication unique information and license information to be sent to the server machine 101, while interpreting a message received from the server machine 101 and giving an instruction to each unit of the client machine 103.

The client-server communication unit 304, which is connected to the server machine 101 via network communications and others, performs message sending/receiving.

The storage device controlling unit 305 controls data stored in the data storage device 104 at the instruction from the message processing unit 303.

The data storage device 104 in the first embodiment is a memory unit holding communication unique information. Such data storage device 104 is usually flash memory rewritable only for a limited number of times, an IC card and so forth. Note that although the data storage device 104 is placed outside the client machine 103 in FIG. 3, it can also be placed inside the client machine 103. Furthermore, it is possible for the data storage device 104 to function as a storing unit to store contents distributed from the server machine 101.

FIG. 4 is a diagram showing an example data configuration of license information stored in the data storage device 102 managed by the server machine 101. Such license information is comprised of the following four items:

1. "Client ID information"

This is a piece of information used to identify a client machine 103 having license information. Each client machine 103 is set up with client ID information at shipment time which cannot be rewritten by its user. Therefore, client ID information is used to identify the owner of license information. Information called a client ID is an example.

2. "Content ID information"

This is a piece of information used to identify contents which can be used with the above-mentioned license information (usage right information). An ISRC code in music contents and a UPC code in packaged contents are examples of such content ID information.

3. "Usage number information"

This is a piece of information indicating the number of times for which contents to be identified by the above-mentioned content ID information can be used. Judgment for this information, which is included in the above-mentioned content usage rules, is made by the client machine 103. For example, ∞ indicates that there is no specification about the number of usages, meaning that contents can be used as many times as possible.

4. "Usage expiring date information"

This is a piece of information indicating an expiration date up until which contents identified by the above-mentioned content ID information can be used. Judgment for this information is made by the client machine 103. If such date is expired, contents cannot be used any more even if a number of usages still remain. For example, ∞ indicates that there is no specification about an usage expiring date, meaning that contents can be used indefinitely.

For example, license information described in the first line in the table of FIG. 4 indicates that, in a client machine 103 to be identified by CLIENTS-ID-11111, contents to be identified by CONTENTS-ID-1111 can be used for ten times until Mar. 31, 2002.

FIG. 5 is an example data configuration of license information stored in the data storage device 104 which is managed by the client machine 103. Such license information is comprised of content ID information, usage number information and usage expiring date information. Note that descriptions of these items are equivalent to those of FIG. 4 and therefore that a concrete explanation for them is omitted.

For example, license information described in the first line in the table of FIG. 5 indicates that contents to be identified by CONTENTS-ID-1111 can be used for five times until Mar. 31, 2002.

Next, the procedure of how license information is transferred from the server machine 101 to the client machine 103 is explained with reference to FIG. 6. FIG. 6 is a communication sequence diagram showing the communication sequence at the time when license information is transferred from the server machine 101 to the client machine 103.

Such communication sequence is comprised of the following four communication messages:

1. "Communication unique information request message (M601 in FIG. 6)"

This is a communication message to be sent from the client machine 103 to the server machine 101 to make a request for sending communication unique information before transferring license information in the server machine 101 to the client machine 103.

2. "Communication unique information response message (M602 in FIG. 6)"

This is a communication message to be sent as a response from the server machine 101 to the client machine 103. Communication unique information prepared in the server machine 101 is sent to the client machine 103.

3. "License information request message (M603 in FIG. 6)"

This is a communication message to be sent from the client machine 103 to the server machine 101 to make a request for transferring license information in the server machine 101 to the client machine 103.

4. "License information response message (M604 in FIG. 6)"

This is a communication message to be sent as a response from the server machine 101 to the client machine 103. License information prepared in the server machine 101 is sent to the client machine 103.

FIGS. 7A, 7B, 7C and 7D are example configurations of various data sent/received between the server machine 101 and the client machine 103 according to the first embodiment.

First, an example configuration of the communication unique information request message M601 is illustrated in FIG. 7A. The communication unique information request message M601 is comprised of the following five data.

Message ID is identification information indicating that the communication message is a communication unique information request message. 0x0101 is described with 2 bytes in the message ID.

Figure 22:
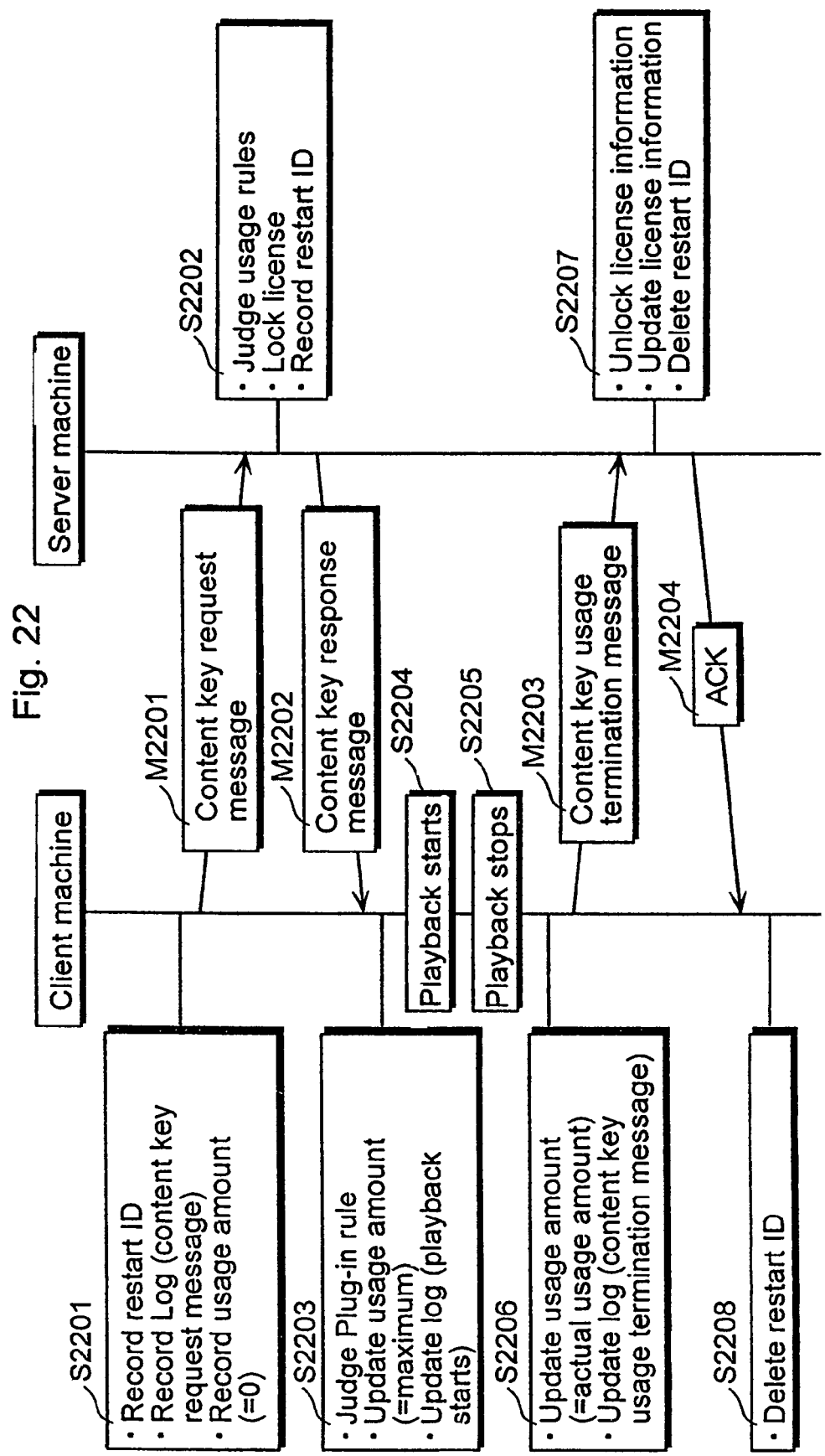
FIG. 22 is a communication sequence diagram concerning content usage between the client machine and the server machine according to the sixth embodiment.

Message size, which is described with 4 bytes, is the size of the communication message excluding the message ID and the message size. In FIG. 7A, 0x00000022 is listed as an example.

Client ID information, which is described with 16 bytes, is information managed by the client ID information managing unit 301 of the client machine 103. In FIG. 7A, CLIENTS-ID-11111 is listed as an example.

Usage number information indicates a permitted number of usages in the exchange of license information through this communication message. Such number of usages is specified with 2 bytes. In FIG. 7A, 0x0005 is listed as an example.

Content ID information indicates a usage right (=license information) of which contents is requested in the exchange of license information through this communication message. Such content ID information is described with 16 bytes. In FIG. 7A, CONTENTS-ID-1111 is described as an example.

Next, an example data configuration of a communication message sent as the communication unique information response message M602 is provided in FIG. 7B. The communication unique information response message M602 is comprised of the following four data.

Message ID is identification information indicating that the communication message is a communication unique information response message. 0x0102 is described with 2 bytes.

Message size, which is described with 4 bytes, is the size of the communication message excluding the message ID and the message size. In FIG. 7B, 0x00000012 is listed as an example.

Status code, which is described with 2 bytes, indicates the result of processing performed for the communication unique information request message in the server machine 101. In FIG. 7B, 0x0000 is listed as an example.

Communication unique information, which is described with 16 bytes, indicates communication unique information used in the license information request message. In FIG. 7B, MESSAGE-ID-11111 is listed as an example.

Furthermore, an example data configuration of a communication message sent as the license information request message is provided in FIG. 7C. The license information request message is comprised of the following four data.

Message ID is identification information indicating that the communication message is a communication unique information response message. 0x0103 is described with 2 bytes.

Figure 20:
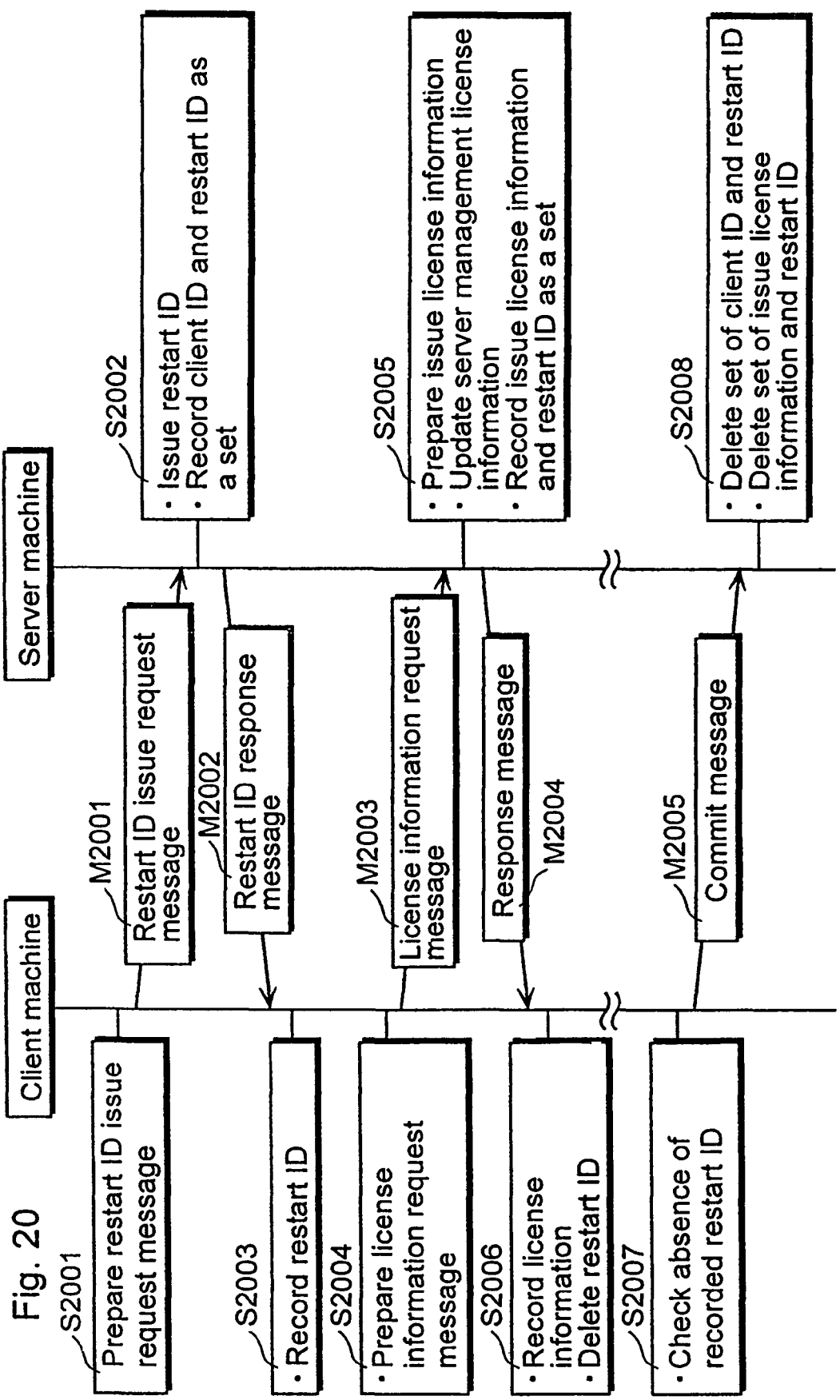
FIG. 20 is a communication sequence diagram showing how license information is transferred from the server machine to the client machine according to the fourth embodiment FIG. 21 a communication sequence diagram showing how license information is transferred from the client machine to the server machine according to the fifth embodiment.

Message size, which is described with 4 bytes, is the size of the communication message excluding the message ID and the message size. In FIG. 7C, 0x00000020 is listed as an example.

Client ID information, which is described with 16 bytes, is information managed by the client ID information managing unit 301 of the client machine 103. In FIG. 7C, CLIENTS-ID-11111 is listed as an example.

Communication unique information, which is described with 16 bytes, indicates communication unique information sent through the communication unique information response message. In FIG. 7C, MESSAGE-ID-11111 is listed as an example.

Moreover, an example data configuration of a communication message sent as the license information response message is provided in FIG. 7D. The license information response message is comprised of the following six data.

Message ID is identification information indicating that the communication message is a communication unique information response message. 0x0104 is described with 2 bytes.

Figure 18:
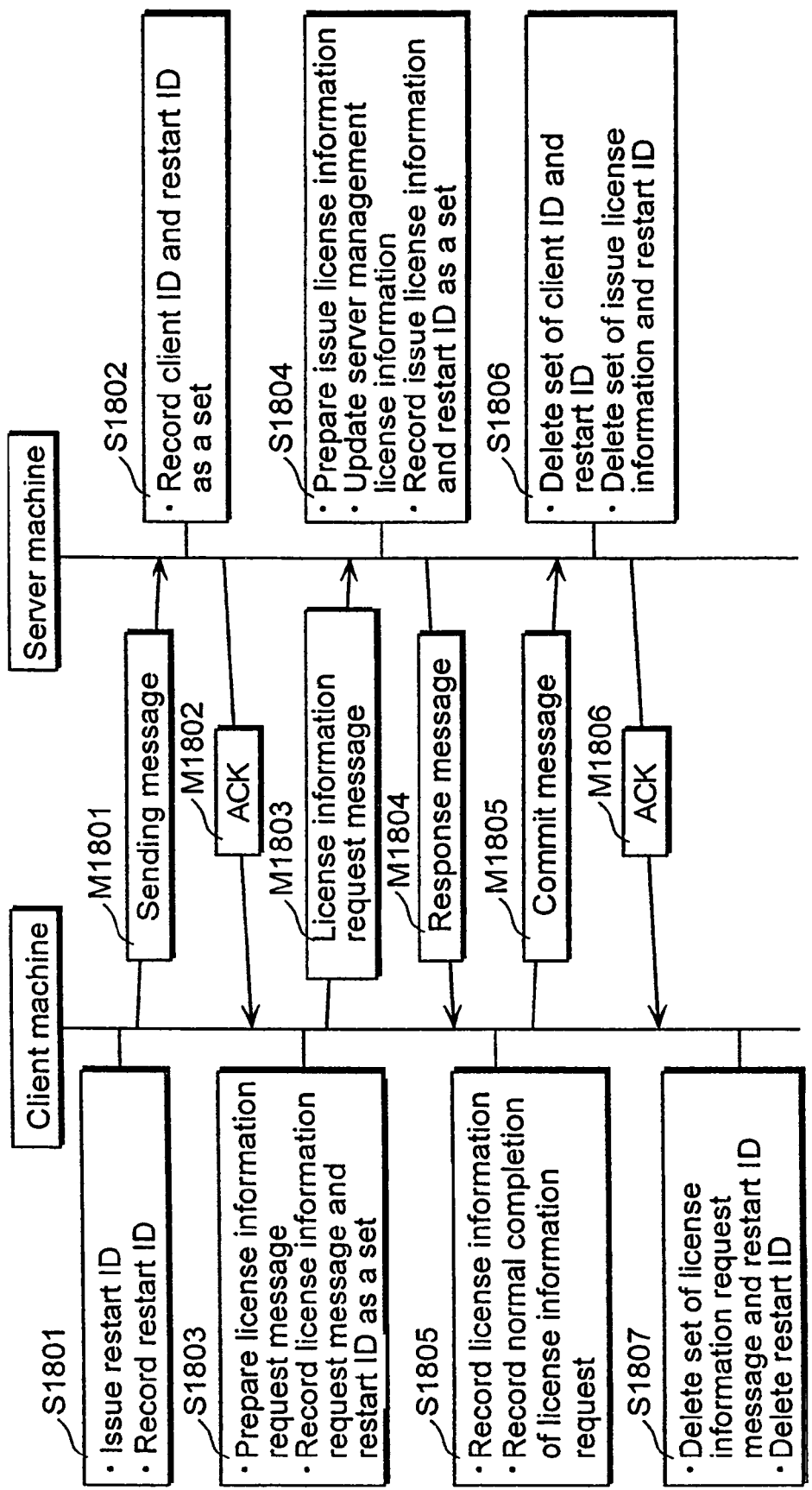
FIG. 18 is a communication sequence diagram showing how license information is transferred from the server machine to the client machine according to the second embodiment.

Message size, which is described with 4 bytes, is the size of the communication message excluding the message ID and the message size. In FIG. 7D, 0x00000018 is listed as an example.

Status code, which is described with 2 bytes, indicates the result of processing performed for the communication unique information request message in the server machine 101. In FIG. 7D, 0x0000 is listed as an example.

Usage number information indicates a permitted number of usages in the exchange of license information through this communication message. Such number of usages is specified with 2 bytes. In FIG. 7D, 0x0005 is listed as an example.

Usage expiring date information indicates the expiration date until when requested contents can be used in the exchange of license information through this communication message. Such information is described in a total of 4 bytes with a year described with 2 bytes and a month/date with 1 byte each. In FIG. 7D, 0x07d2031F is listed as an example.

Content ID information indicates a usage right (=license information) of which contents is permitted in the exchange of license information through this communication message. Such content ID information is described with 16 bytes. In FIG. 7D, CONTENTS-ID-1111 is listed as an example.

Next, an explanation is provided for the operation illustrated in S601 in FIG. 6 which takes place in the client machine 103 before a communication unique information request message is sent. In the client machine 103, the user input unit 302 accepts an input from the user of the client machine 103 regarding contents s/he requests and a permitted number of usages before the communication unique information request message is sent. Based on this input and client ID information managed by the client ID information managing unit 301, the message processing unit 303 creates a communication unique information request message. The created communication message is sent to the server machine 101 by the client-server communication unit 304.

Next, an explanation is provided for the operation illustrated in S602 in FIG. 6 which takes place in the server machine 101 from when the communication unique information request message is received to when a communication unique information response message is sent. In the server machine 101, when the server-client communication unit 204 receives the communication unique information request message, the message processing unit 203 interprets this communication message and judges that it is a communication unique information request message according to the message ID described in the top 2 bytes of the communication message.

Next, the server machine 101 generates communication unique information in the communication unique information generating unit 202. The generated communication unique information and the client ID information/usage number information/content ID information in the communication message are recorded in the data storage device 102 by the storage device controlling unit 205 as a set of request information. Note that a detailed description of such request information is provided later.

Furthermore, the message processing unit 203 generates a communication unique information response message based on the generated communication unique information. The generated communication message is sent to the client machine 103 by the server-client communication unit 204. Note that a status code is always set to the normal value of 0x0000 in the first embodiment.

Next, an explanation is provided for the operation illustrated in S603 in FIG. 6 which takes place in the client machine 103 from when the communication unique information response message is received to when a license information request message is sent. In the client machine 103, when the client-server communication unit 304 receives the communication unique information response message, the message processing unit 303 interprets this communication message and judges that it is a communication unique information response message according to the message ID described in the top 2 bytes of the communication message.

Next, the client machine 103 acquires the communication unique information included in the communication unique information response message and the storage device controlling unit 305 records this communication unique information in the data storage device 104.

Furthermore, the message processing unit 303 generates a license information request message based on the communication unique information and the client ID information managed by the client ID information managing unit 301. The generated communication message is sent to the server machine 101 by the client-server communication unit 304. In such a case as this where a license information request message (M603) is sent so as to exchange license information, communication unique information serving as a unique identifier is sent together.

FIG. 8 provides an example data configuration of the request information. Four data making up such request information is described below.

Communication unique information is a piece of information used to identify a message created in the server machine 101. MESSAGE-ID-11111 is described in such communication unique information. Client ID information indicates the client ID information of the client machine 103. CLIENTS-ID-11111 is described in such client ID information. Usage number information indicates the number for which contents requested by a user can be used. 0x0005 is described in such usage number information. Further, content ID information is information used to identify contents the user requests. CONTENTS-ID-1111 is described in such content ID information.

Figure 10:
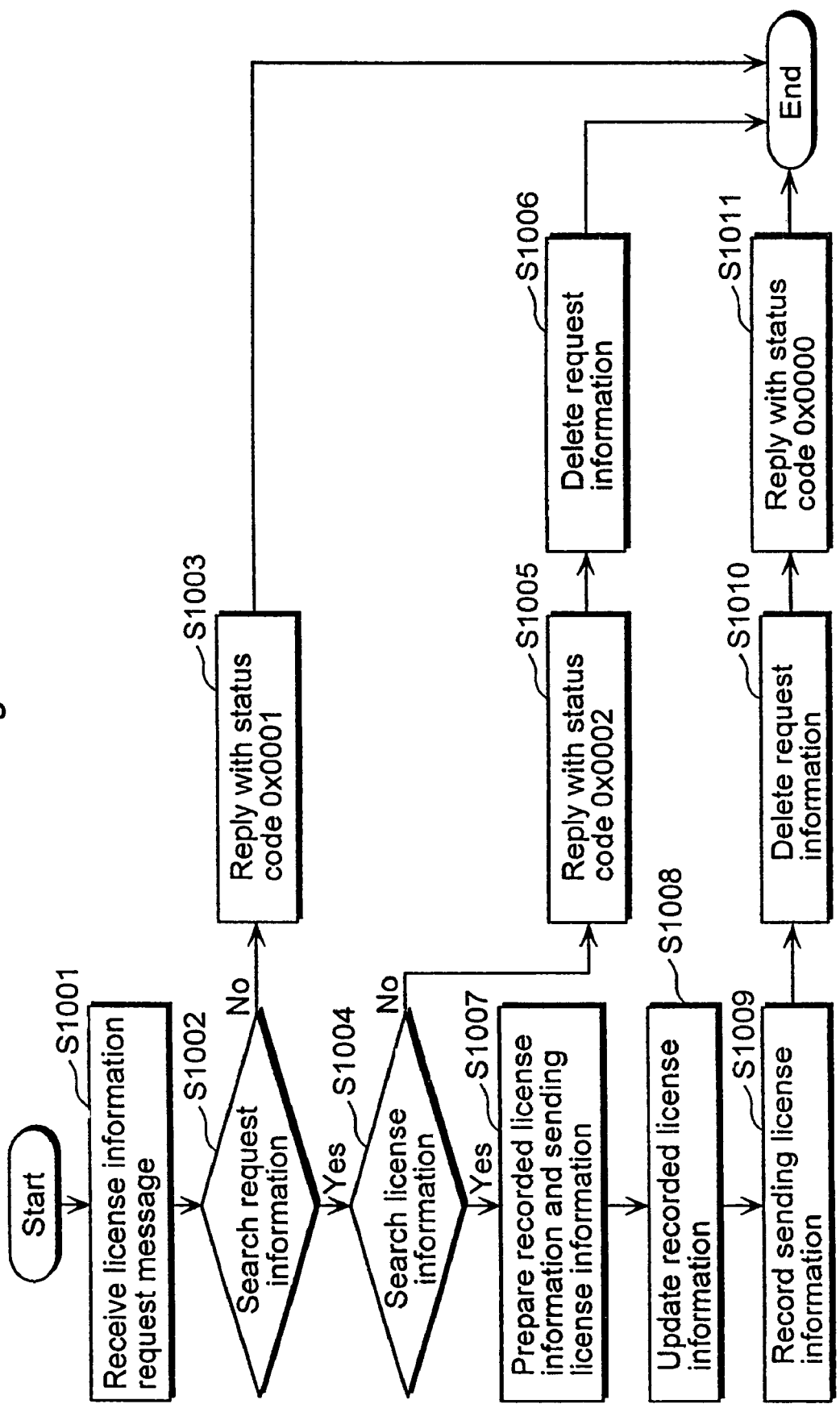
FIG. 10 is a flowchart explaining an operation after the license information request message is received in the server machine according to the first embodiment.

Next, an explanation is provided with reference to a flowchart in FIG. 10 for the operation illustrated in S604 in FIG. 6 which takes place in the server machine 101 from when the license information request message is received to when a license information response message is sent. FIG. 10 is a flowchart showing the operating sequence from when a license information request message is received to when a license information response message is sent in the server machine 101.

In the server machine 101, when the server-client communication unit 204 receives the communication unique information request message, the message processing unit 203 interprets this communication message and judges that it is a license information request message according to the message ID described in the top 2 bytes of the communication message (S1001).

Next, the server machine 101 acquires the client ID information and the communication unique information from the communication message interpreted in the message processing unit 203, based on which the server machine 101 searches for information in which the client ID information and the communication unique information are matched from among request information stored in the data storage device 102 by the storage device controlling unit 205. If such information is not found, the message processing unit 203 creates a license information response message in which an abnormal value of 0x0001 is set to the status code and then this communication message is sent to the client machine 103 by the server-client communication unit 204 (S1002, S1003).

If information exists in which the client ID information and the communication unique information are matched, the storage device controlling unit 205 searches for information in which the client ID information and the content ID information are matched from among license information stored in the data storage device 102, based on the client ID information and the content ID information described in the request information. If such information is not found, the message processing unit 203 creates a license information response message in which another abnormal value of 0x0002 is set to the status code and then this communication message is sent to the client machine 103 by the server-client communication unit 204. After this, the storage device controlling unit 205 deletes the request information stored in the data storage device 102 in the server machine 101 (S1004~S1006).

If information exists in which the client ID information and the content ID information are matched, based on the request information and the license information, the license information processing unit 201 prepares license information to be sent to the client machine 103 and license information to be recorded in the server machine 101. Note that license information to be sent to the client machine 103 is referred to as sending license information and license information to be recorded/managed by the server machine 101 is referred to as recorded license information hereinafter and in diagrams in order to make a distinction between these two types of license information. The sending license information prepared by the license information processing unit 201 is recorded in the data storage device 102 by the storage device controlling unit 205. Meanwhile, the license information recorded in the data storage device 102 is overwritten by the storage device controlling unit 205 with the recorded license information after update which is prepared by the license information processing unit 201. Moreover, the request information recorded in the data storage device 102 is deleted by the storage device controlling unit 205 (S1007~S1010).

Finally, based on the sending license information, the message processing unit 203 creates a license information response message and the server-client communication unit 204 sends this communication message to the client machine 103. Note that the normal value of 0x0000 is recorded for the status code here (S1011).

FIG. 9 provides an example data configuration of the sending license information. The sending license information is comprised of the following five data.

Communication unique information is used to identify a message created in the server machine 101. MESSAGE-ID-11111 is listed in such communication unique information. Client ID information indicates the client ID information of the client machine 103. CLIENTS-ID-11111 is listed in such client ID information. Usage number information indicates the number of times the user can use contents. 0x0005 is listed in such usage number information. Usage expiring date information indicates an expiration date until when contents the user is permitted to use can be used. 0x07d2031F is listed in such usage expiring date information. Also, content ID information is information used to identify contents the user requests. CONTENTS-ID-1111 is listed in such content ID information.

Next, an explanation is provided for the operation illustrated in S605 in FIG. 6 which takes place in the client machine 103 after the license information response message is received. In the client machine 103, when the client-server communication unit 304 receives the license information response message, the message processing unit 303 interprets this communication message and judges that it is a license information response message according to the message ID described in the top 2 bytes of the communication message.

Then, the client machine 103 acquires the status code included in the license information response message to judge whether the normal value of 0x0000 is set or not. If the normal value is not set to the status code, the storage device controlling unit 305 deletes the communication unique information used at sending time from the data storage device 104.

If the value was the normal value, the client machine 103 prepares license information based on the usage number information/usage expiring date information/content ID information included in the received license information response message, and the storage device controlling unit 305 records this license information in the data storage device 104. Furthermore, the storage device controlling unit 305 deletes the communication unique information used at sending time from the data storage device 104.

Next, an explanation is provided for the operation in the event of communication failure at the time of sending a communication unique information request message. If communication failure occurs when sending the communication unique information request message, although the client machine 103 has already succeeded in sending such communication message, the server machine 101 has yet to receive it. Therefore, processing illustrated in S602 in FIG. 6 is not to be performed, meaning that the communication unique information response message is not to be sent. This results in the client machine 103's failure of receiving the communication unique information response message. When this kind of situation occurs, the client machine 103 starts trying to resend the communication unique information request message after a certain period of time. In other words, the client machine 103 performs time-out processing to send the communication unique information request message again when the next session is established.

Next, an explanation is provided for the operation in the event of communication failure at the time of sending a communication unique information response message. When communication failure occurs in sending the communication unique information response message, although the server machine 101 has already succeeded in sending such communication message, the client machine 103 has yet to receive it. For the client machine 103, this situation is not different from the one where communication failure occurs at the time of sending the communication unique information request message. Therefore, the client machine 103 starts trying to resend the communication unique information request message after a certain period of time. Note that the server machine 101 is not to resend the communication unique information response message. Meanwhile, when the server machine 101 receives more than one communication unique information request message as a result of resending the communication unique information request message, different communication unique information is provided on a per-communication message basis.

In other words, the client machine 103 performs time-out processing to send the communication unique information request message again when the next session is established. Note that for this communication unique information request message, the server machine 101 is to use communication unique information which is different from one used at the time of communication failure.

Next, an explanation is provided for the operation in the event of communication failure at the time of sending a license information request message. When communication failure occurs in sending the license information request message, although the client machine 103 has already succeeded in sending such communication message, the server machine 101 has yet to receive it. Therefore, processing illustrated in S604 in FIG. 6 is not to be performed, meaning that the license information response message is not to be sent. This results in the client machine 103's failure of receiving the license information response message. When this kind of situation occurs, the client machine 103 starts trying to resend the license information request message after a certain period of time.

In other words, the client machine 103 performs time-out processing to send the license information request message again when the next session is established. Note that for this license information request message, the client machine 103 uses the same communication unique information as the one used at the time of communication failure.

Next, an explanation is provided for the operation in the event of communication failure at the time of sending a license information response message. When communication failure occurs in sending the license information response message, although the server machine 101 has already succeeded in sending such communication message, the client machine 103 has yet to receive it. For the client machine 103, this situation is not different from the one where communication failure occurs at the time of sending the license information request message. Therefore, the client machine 103 starts trying to resend the license information request message after a certain period of time. Meanwhile, the server machine 101 is not to resend the license information response message.

In other words, the client machine 103 performs time-out processing to send the license information request message again when the next session is established. When receiving again the license information request message which is provided with the same communication unique information, the server machine 101 sends to the client machine 103 the same license information response message again as the one used at that time of communication failure, without performing update of the license information such as an update of content usage rules and the deletion of the request information. Note that the communication unique information stored in the server machine 101 is to be deleted when a commit message command from the client machine 103 is received.

In preparation for the case where the server machine 101 receives the license information request message again as a result of such license information request message having been resent, a modification is needed for the processing procedure of the server machine 101 explained with reference to FIG. 10. The modified operating procedure is illustrated in FIG. 11, which is a flowchart showing the operating procedure to be followed when the server machine 101 receives the license information request message again.

Figure 11:
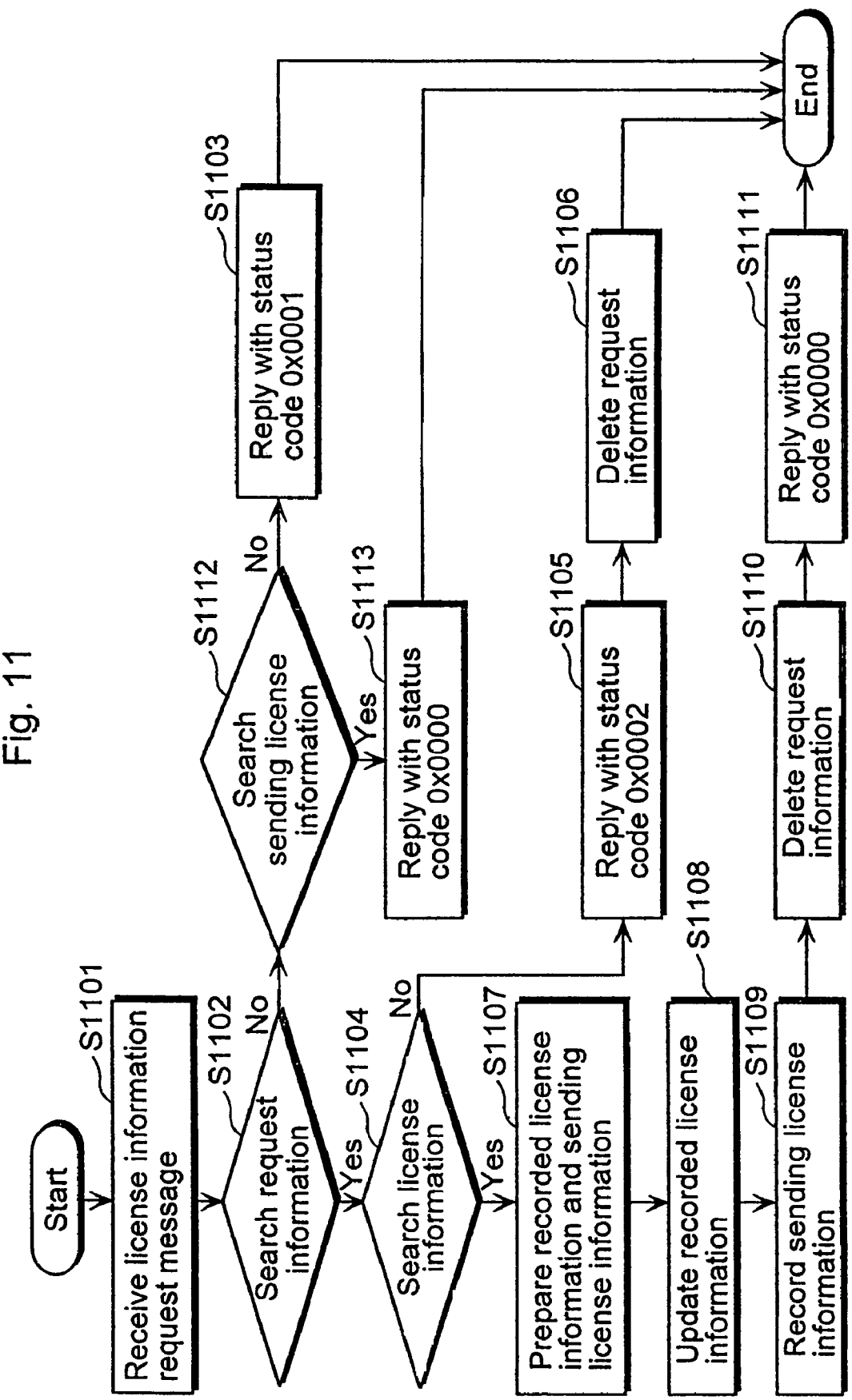
FIG. 11 is a flowchart, with consideration given to a response to communication failure, explaining an operation after the license information request message is received in the server machine according to the first embodiment.

FIG. 11 has S1112 and S1113, which are not included in the processing procedure of the server machine 101 as explained in FIG. 10. Since the request information is already deleted after the receipt of the license information request message, a search for the request information illustrated in S1102 always fails. In order to circumvent this problem, processing illustrated in S1112 is required. In the server machine 101, the storage device controlling unit 205 searches for the sending license information stored in the data storage device 102 based on the client ID information and the communication unique information included in the license information request message (S1112). If such sending license information is not found, the message processing unit 203 creates a license information response message in which an abnormal value of 0x0001 is set to the status code, as in the case where the request information is not found, and then the server-client communication unit 204 sends this communication message to the client machine 103 (S1103).

If such information is found, the message processing unit 203 creates a license information response message based on the searched sending license information and then the server-client communication unit 204 sends this communication message to the client machine 103. Note that the normal value of 0x0000 is recorded for the status code in this case (S1113).

If communication failure occurs when sending a communication unique information response message, more than one piece of request information are prepared to be recorded in the data storage device 102 of the server machine 101. Moreover, these pieces of request information are not subject to deletion as a result of the subsequent processing. Furthermore, after the server machine 101 receives a license information request message, sending license information is prepared to be recorded in the data storage device 102 of the server machine 101. Similarly, this sending license information is not to be deleted unless any processing is performed for it. However, since resources of the server machine 101 are cluttered by such pieces of information being stored as they are, an action to delete these pieces of information is required. For this purpose, the client machine 103 sends a commit message.

FIG. 12 is a diagram showing the data configuration of a commit message. Such data is comprised, for example, of three data described below.

Message ID is identification information indicating that the communication message is a commit message. 0x0201 is described with 2 bytes in such message ID.

Message size, which is described with 4 bytes, is the size of the communication message excluding the message ID and the message size. In FIG. 12, 0x00000010 is listed as an example.

Client ID information, which is described with 16 bytes, is information managed by the client ID information managing unit 301 of the client machine 103. In FIG. 12, CLIENTS-ID-11111 is listed as an example.

In the client machine 103, after the license information response message is received, the server machine 101 sends a commit message via the client-server communication unit 304 if no communication unique information is stored in the data storage device 104.

In the server machine 101, when the server-client communication unit 204 receives the commit message, the message processing unit 203 interprets this communication message and judges that it is a commit message according to the message ID described in the top 2 bytes of the communication message. If the message is judged as a commit message, the storage device controlling unit 205 makes a search from among request information and sending license information stored in the data storage device 102, based on the client ID information included in the commit message. As a result, all pieces of searched (i.e., found) request information and sending license information are deleted.

While sending is retried for some times in the event of communication failure, there arises a possibility that all such retries end in failure depending on a state of the communication. Especially under circumstances where the client machine 103 is not connected to the network all the time, it is possible that a breakdown of the network connection occurs while an attempt is being made for resending. In a case where such attempt for resending has not been successful for a long period of time, it is possible that the user gives up the use of contents during that period. In such a case, the acquisition of requested license information needs to be cancelled too. For this purpose, a communication cancellation message is prepared for such communication. FIG. 13 is a reference diagram showing the configuration of data to be exchanged between the client machine 103 and the server machine 101 at the time of cancellation.

First, the data configuration of a cancellation request message to be sent from the client machine 103 to the server machine 101 is provided in FIG. 13A. Such data is comprised, for example, of the following four data.

Message ID is identification information indicating that the communication message is a cancellation request message. 0x0301 is described with 2 bytes in such message ID.

Message size, which is described with 4 bytes, is the size of the communication message excluding the message ID and the message size. In FIG. 13A, 0x00000020 is listed as an example.

Client ID information, which is described with 16 bytes, is information managed by the client ID information managing unit 301 of the client machine 103. In FIG. 13A, CLIENTS-ID-11111 is listed as an example.

Communication unique information, which is described with 16 bytes, indicates communication unique information sent through a communication unique information response message. In FIG. 13A, MESSAGE-ID-11111 is listed as an example.

Next, FIG. 13B illustrates the data configuration of a cancellation response message to be sent to the client machine 103 after the server machine 101 receives the cancellation request message and performs necessary processing for it. Such data is comprised, for example, of three data.

Message ID is identification information indicating that the communication message is a cancellation response message. 0x0302 is described with 2 bytes in such message ID.

Message size, which is described with 4 bytes, is the size of the communication message excluding the message ID and the message size. In FIG. 13B, 0x00000002 is listed as an example.

Status code, which is described with 2 bytes, indicates the result of processing performed for the cancellation request message in the server machine 101. In FIG. 13B, 0x0000 is listed as an example.

A cancellation request message is used until the client machine 103 receives a license information response message after sending a license information request message. If it is before a license information request message is sent, just sending a commit message is required providing that communication unique information is deleted. If it is after a license information response message is received, transfer of the received license information is just required by following the communication procedure for transferring license information from the client machine 103 to the server machine 101 as described later.

In contrast, if it is after the client machine 103 sends a license information request message, since there is a possibility that license information stored in the server machine 101 is already updated as a result of the receipt of such communication message by the server machine 101, a cancellation message is required so as to restore such updated license information to the state before update.

Moreover, a cancellation request message is not always delivered to the server machine 101 after one sending attempt. If the client machine 103 fails to receive a cancellation response message for a cancellation request message, the cancellation request message is to be sent repeatedly.

Figure 14:
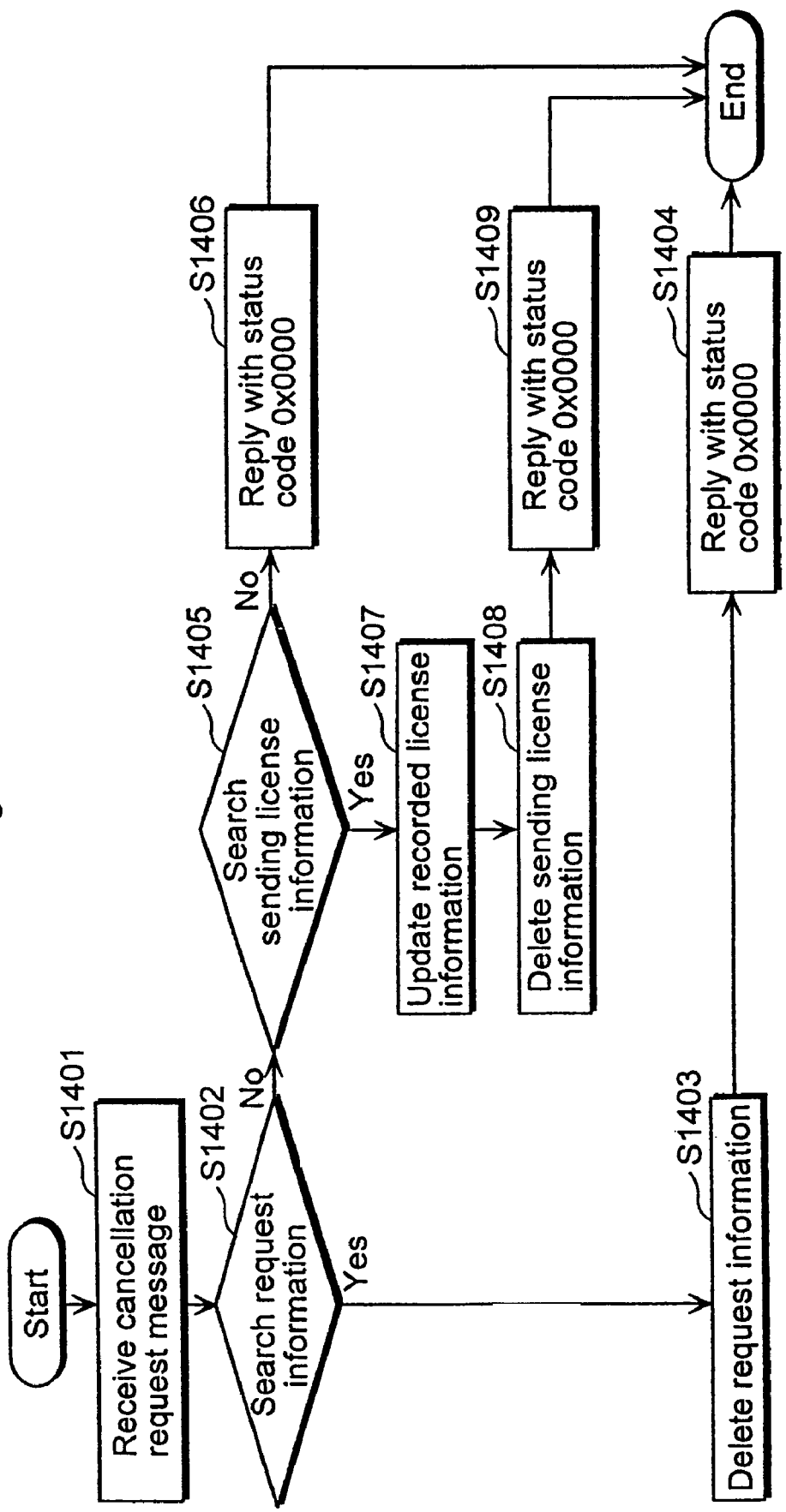
FIG. 14 is a flowchart explaining an operation after the cancellation request message is received in the server machine according to the first embodiment.

Next, an explanation is provided for the operation, with reference to a flowchart in FIG. 14, which takes place in the server machine 101 after the cancellation request message is received. FIG. 14 is a flowchart showing the operating procedure to be followed after the cancellation request message is received in the server machine 101.

In the server machine 101, when the server-client communication unit 204 receives the license information request message, the message processing unit 203 interprets this communication message and judges that it is a license information request message according to the message ID described in the top 2 bytes of the communication message (S1401).

Next, the server machine 101 acquires the client ID information and the communication unique information from the communication message interpreted in the message processing unit 203, based on which the server machine 101 performs a search for information in which the client ID information and the communication unique information are matched from among request information stored in the data storage device 102 by the storage device controlling unit 205. If such information is found, the message processing unit 203 creates a cancellation response message in which the normal value of 0x0000 is set to the status code, after the searched request information is deleted. Then, this communication message is sent to the client machine 103 by the server-client communication unit 204. This processing is performed if a cancellation is made when the license information request message is yet to be delivered to the server machine 101 (S1402~S1404).

If there exists no information in the request information in which the client ID information and the communication unique information are matched, the storage device controlling unit 205 searches for the sending license information in which the client ID information and the communication unique information are matched from among sending license information stored in the data storage device 102. If such information is not found, the message processing unit 203 creates a cancellation response message in which the normal value of 0x0000 is set to the status code and then this communication message is sent to the client machine 103 by the server-client communication unit 204. This processing is performed when the serve machine 101 has already received the cancellation request message and both the request information and the sending license information are deleted from the server machine 101 (S1405, S1406).

If the sending license information is found, based on the client ID information and the content ID information included in this sending license information, the storage device controlling unit 205 searches for the recorded license information stored in the data storage device 102. Since the sending license information is generated based on the recorded license information, the recorded license information is found without fail by this search. The license information described in the sending license information is added to the searched recorded license information, which is overwritten with the resulting license information to be stored in the data storage device 102 by the storage device controlling unit 205. After this, the searched sending license information is deleted and the message processing unit 203 creates a cancellation response message in which the normal value of 0x0000 is set to the status code. Then, this communication message is sent to the client machine 103 by the server-client communication unit 204. This processing is performed when the following three conditions are satisfied: the server machine 101 has already received the license information request message; the request information is deleted; and the sending license information is recorded (S1407~S1409).

Figure 15:
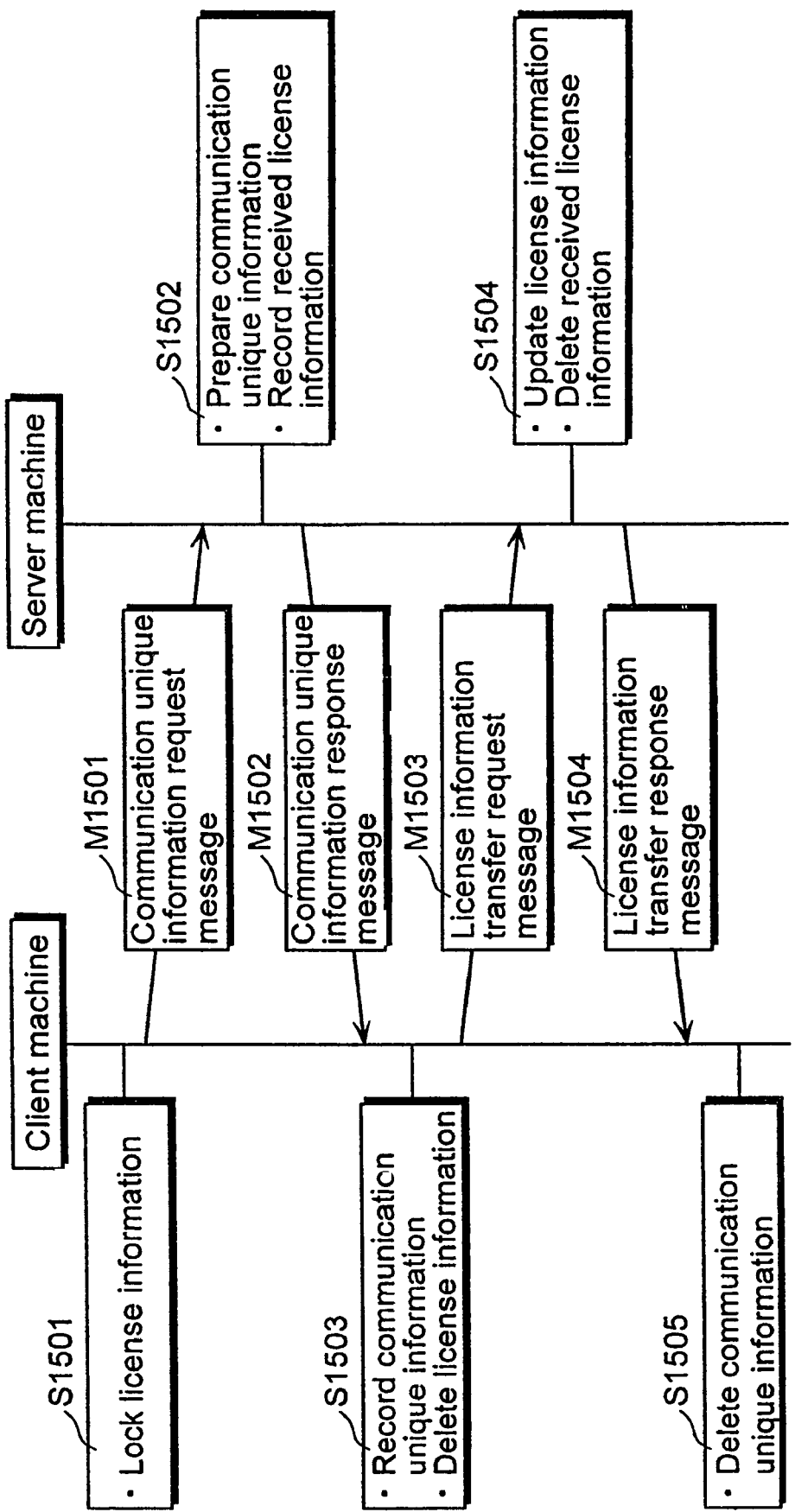
FIG. 15 is a communication sequence diagram showing a procedure of how license information is transferred from the client machine to the server machine according to the first embodiment.

Next, the procedure of how license information is transferred from the client machine 103 to the server machine 101 is explained with reference to FIG. 15. FIG. 15 is a communication sequence diagram showing the communication sequence at the time when the license information is transferred from the client machine 103 to the server machine 101. The communication sequence is comprised of the following four messages:

1. "Communication unique information request message (M1501 in FIG. 15)"

This is a communication message to be sent from the client machine 103 to the server machine 101 for sending license information and for requesting communication unique information so as to transfer license information in the client machine 103 to the server machine 101. Client ID information is included as in the case of the transfer from the server machine 101 to the client machine 103.

2. "Communication unique information response message (M1502 in FIG. 15)"

This is a communication message to be sent from the server machine 101 to the client machine 103. Communication unique information prepared in the server machine 101 is sent to the client machine 103 as a response. A status code is included as in the case of the transfer from the client machine 103 to the server machine 101.

3. "License information transfer request message (M1503 in FIG. 15)"

This is a communication message to be sent from the client machine 103 to the server machine 101. Communication unique information and client ID information are included as in the case of the transfer from the server machine 101 to the client machine 103.

4. "License information transfer response message (M1504 in FIG. 15)"

This is a communication message to be sent from the server machine 101 to the client machine 103. The result of license information transfer is sent. A status code is included as in the case of the transfer from the client machine 103 to the server machine 101.

Before and after sending/receiving each message, the client machine 103 or the server machine 101 performs the following five processing:

1. "Before sending communication unique information request message (S1501 in FIG. 15)"

License information stored in the data storage device 104 is locked to be made unusable. This aims at preventing an unauthorized use of the license information until when processing for deleting such license information illustrated in S1503 is performed. Furthermore, based on the license information and the client ID information, a communication unique information request message is created to be sent to the server machine 101.

2. "Before sending communication unique information response message (S1502 in FIG. 15)"

The server machine 101 prepares communication unique information and records it together with received license information and client ID information as a set of received license information. The communication unique information is sent to the client machine 103.

3. "Before sending license information transfer request message (S1503 in FIG. 15)"

License information stored in the data storage device 104 is deleted. Next, the received communication unique information is recorded and a license information transfer request message is created based on the communication unique information and the client ID information to be sent to the server machine 101.

4. "Before sending license information transfer response message (S1504 in FIG. 15)"

The received license information stored in the data storage device 102 is made available. This processing is equal to the recording of the received license information as license information. Note that the received license information may be merged with the existing license information and recorded. After this, a license information transfer response message is created to be sent to the client machine 103. Then, the received license information recorded in S1502 is deleted so that the license information cannot be updated more than once even if a license information transfer request message (M1503) is received for a plurality number of times.

5. "After receiving license information transfer response message (S1505 in FIG. 15)"

Communication unique information stored in the data storage device 104 is deleted. Note that no cancellation can be made in this communication sequence.

Note that, with the data configuration of the license information managed by the server machine 101 according to the present embodiment, although the owner of the license information is identified according to the client ID information, another piece of user identification information may be employed for identifying the owner of such license information. In this case, another data is required to associate the user identification information with the client ID information.

Moreover, with the data configuration of the license information managed by the server machine 101 according to the present embodiment, although there exists no identifier for the license information itself, it is possible that such an identifier exists. This sort of identifier is effective for such a case where more than one usage right is owned for the same contents on the same terminal.

Furthermore, with the above data configuration of the license information managed by the server machine 101 according to the present embodiment, although only one piece of content ID information is specified for each license information, it may be configured in a manner in which more than one piece of content ID information is specified. In this case, the configuration of a database is described as a relational database in order to compress the database size.

Also, with the data configuration of the license information managed by the server machine 101 according to the present embodiment, although the usage number information and the usage expiring date information are presented as content usage rules, another rule such as cumulative usage time may also be specified. Especially when license information is identified according to user identification information rather than client ID information, there arises a possibility that the same license information is acquired by more than one client machine 103. In such a case, a usage rule to limit the number of client machines 103 allowed to acquire the same license information at a time may be specified. Such usage rule indicates the number of machines allowed to use the same contents at the same time.

Moreover, although the communication unique information request message and the license information request message are configured to include the client ID information according to the present embodiment, the client ID information may be sent before sending/receiving a series of such communication messages. In order to prevent falsification and tapping on the communication channel, an SAC (Secure Authentication Channel) such as SSL (Secure Sockets Layer Protocol) is often utilized, especially when license information is exchanged, but it is desirable from the standpoint of security that client ID information is embedded into an authentication to be exchanged on the establishment of SAC.

Furthermore, although the permitted usage number information is sent in the communication unique information request communication according to the present embodiment, such information may be sent in the license information request communication. Note that a modification is needed to information and others to be stored in the server machine 101 in such a case.

Also, although the license information is sent in the communication of the communication unique information request message M1501 for transferring the license information from the client machine 103 to the server machine 101 according to the present embodiment, the license information may be transferred in the communication of the license information transfer request message M1503.

Moreover, although a cancellation cannot be made in the transfer of the license information from the client machine 103 to the server machine 101 according to the present embodiment, a cancellation message may also be prepared. In this case, the deleted license information needs to be sent to the client machine 103 at cancellation time.

The Second Embodiment

Next, an explanation is provided for a license information exchange system according to the second embodiment. The license information exchange system according to the second embodiment is characterized by that a restart ID issued on the part of the client machine 103 is used as communication unique information for identifying a series of communication sequences to exchange license information and that improvement is made for a commit performed for a restart ID after a license information exchange is carried out. Note that such restart ID is information equivalent to the communication unique information presented in the first embodiment which is used to identify a series of communication sequences.

Figure 16:
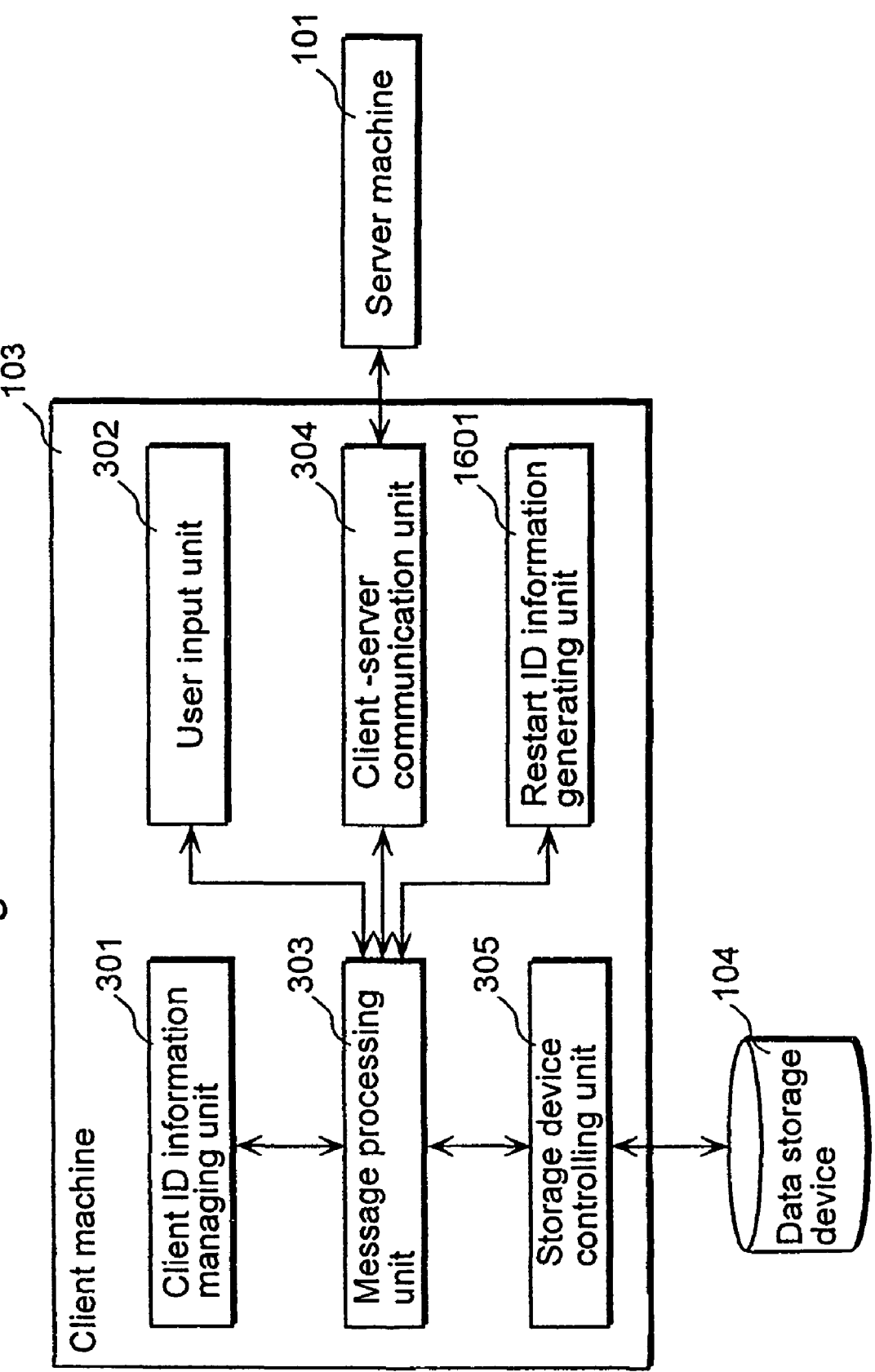
FIG. 16 is a diagram showing an internal configuration of the client machine according to the second embodiment.

FIG. 16 is a diagram showing the internal configuration of the client machine 103 according to the second embodiment. The client machine 103 includes a restart ID information generating unit 1601 in addition to the configuration shown in the first embodiment. Note that the other units of the client machine 103 are the same as those described in the first embodiment and therefore, that a concrete explanation for them is omitted.

The restart ID information generating unit 1601 generates a restart ID as communication unique information at the instruction from the message processing unit 303. For this reason, the communication unique information request message M601 from the client machine 103 explained in the first embodiment can be omitted.

Figure 17:
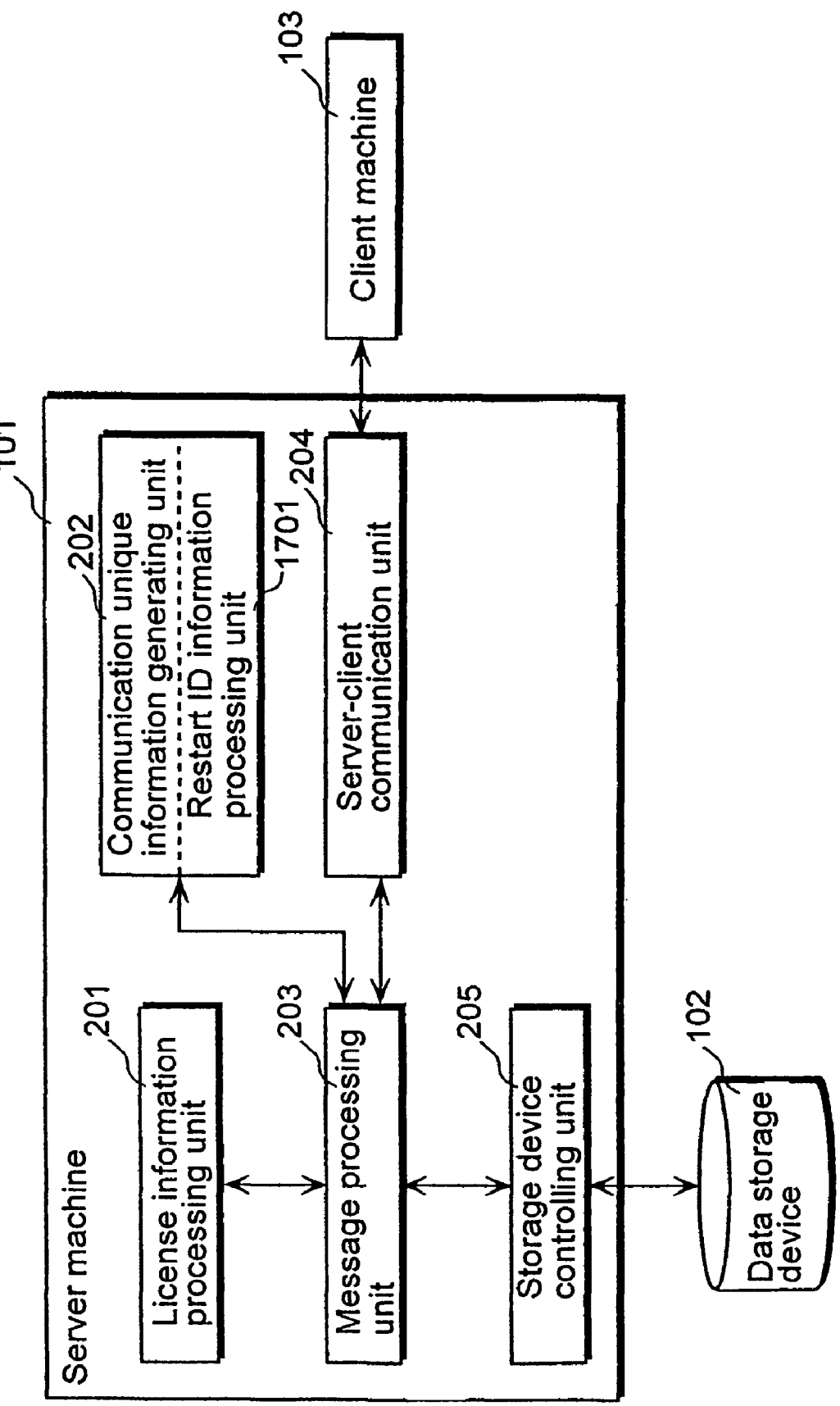
FIG. 17 is a diagram showing an internal configuration of the server machine according to the second embodiment.

FIG. 17 is a diagram showing the internal configuration of the server machine 101 according to the second embodiment. The server machine 101 includes a restart ID information processing unit 1701 in addition to the configuration shown in the first embodiment. Note that the other units of the server machine 101 are the same as those described in the first embodiment and therefore, that a concrete explanation for them is omitted.

The restart ID information processing unit 1701 identifies a restart ID included in a message which is generated in the restart ID information generating unit 1601 of the client machine 103 and which is received via the server-client communication unit 204.

FIG. 18 is a communication sequence diagram showing how license information is transferred from the server machine 101 to the client machine 103 according to the second embodiment. Note that, although not illustrated in the diagram, as a premise for sending/receiving a message for transferring license information, a session of TCP/IP, which is a protocol concerning a communication channel for message data, is established first, and then a session of SSL, which is one of the secure communication channels, or others is established. Note that it is through an authentication carried out at the time of this session establishment that the client ID of the client machine 103 is sent to the server machine 101.

Communication messages which comprise the communication procedure for the license information transfer are described below.

Concerning the operation illustrated in S1801 in FIG. 18 which takes place in the client machine 103 before sending a restart ID, the user of the client machine 103 starts exchanging license information via the user input unit 302. The message processing unit 303 gives an instruction to the restart ID information generating unit 1601 to issue a restart ID. Following this instruction, the restart ID information generating unit 1601 issues a restart ID as communication unique information, which is then recorded in the data storage device 104 by the storage device controlling unit 305 at the instruction from the message processing unit 303. Note that an unused restart ID is always issued in order to assure uniqueness in a series of communication processes. Next, the message processing unit 303 creates a sending message including a restart ID, which is then sent to the server machine 101 via the client-server communication unit 304.

Accordingly, by generating a restart ID on the part of the client machine 103 according to the second embodiment, there is no need for the client machine 103 to make a request of the server machine 101 for issuing a restart ID, which results in an efficient communication. Moreover, since the server machine 101 does not have to perform processing for issuing a restart ID, reduction in processing load on the server machine 101 is realized.

Next, an explanation is provided for the operation illustrated in S1802 in FIG. 18 which takes place in the server machine 101 from when the restart ID is received to when an ACK (acknowledgement) is sent. When a sending message (M1801) is received by the server-client communication unit 204, the message processing unit 203 interprets this sending message and judges that it is a restart ID issue message according to the message ID described in the top 2 bytes of the message.

Then, the storage device controlling unit 205 equipped in the server machine 101 records the client ID and the restart ID included in the sending message together as a set in the data storage device 102. By using both a client ID and a restart ID as an identifier, uniqueness in the communication processing procedure can be easily assured.

Furthermore, the message processing unit 203 sends an ACK (M1802) as a response to the sender of the sending message (M1801), that is to say, the client machine 103, for confirmation purposes.

Meanwhile, if an ACK is not sent, the client machine 103 performs time-out processing and others, and then sends again to the server machine 101 the sending message (M1801) which includes the restart ID stored in the data storage device 104. Therefore, the client machine 103 does not have to prepare and record such restart ID again. This contributes to the reduction in the number of usages of the data storage device 104 which is rewritable only for a limited number of times.

Regarding the operation illustrated in S1803 in FIG. 18 which takes place in the client machine 103 from when the ACK is received to when a license information request message is sent, the client-server communication unit 304 receives the ACK (M1802) and the message processing unit 303 judges that it is an acknowledgement from the server machine 101 concerning the receipt of the restart ID.

Next, the message processing unit 303 of the client machine 103 prepares a license information request message. Preparation of such license information request message is carried out, for example, by the user input unit 302 which selects contents, content usage rules and others from the contents list displayed on a TV screen and the like, when the user watches, listens to, or plays contents s/he requests.

At the instruction from the message processing unit 303, the storage device controlling unit 305 records the license information request message and the restart ID together as a set in the data storage device 104. The message processing unit 303 creates a license information request message (M1803) which includes the license information request information, the restart ID, the content ID to serve as an identifier for contents requested by the user and others, and sends it to the server machine 101 via the client-server communication unit 304.

Next, an explanation is provided for the operation illustrated in S1804 in FIG. 18 which takes place in the server machine 101 from when the license information request message is received to when a response message is sent. When the license information request message (M1803) is received by the server-client communication unit 204, the message processing unit 203 interprets this request message and judges that it is a license information request.

Next, the server machine 101 acquires the client ID and the restart ID from the received license information request message (M1803), based on which the server machine 101 searches for the license information whose client ID and the restart ID are matched from among license information stored in the data storage device 102 by the storage device controlling unit 205. If such license information is found, based on the client ID and the content ID described in the license information, the storage device controlling unit 205 searches for the license information whose client ID and content ID are matched from among license information stored in the data storage device 102.

If the license information whose client ID and content ID are matched is found, based on the received license information request message and the license information, the license information processing unit 201 prepares issue license information to be sent to the client machine 103 and server management license information to be recorded in the server machine 101. The storage device controlling unit 205 records the issue license information prepared by the license information processing unit 201 and the restart ID together as a set in the data storage device 102. Such issue license information includes content usage rules, content key information needed to decrypt encrypted contents, and others. Note that such content usage rules include, for example, a rule to control an action of contents (e.g., playback, copying, qualification specification, etc.), rules needed to judge whether to start such action (e.g., usage expiring date, usage number, cumulative usage time, etc.) and others.

When the server machine 101 receives the license information request message (M1803) again due to such a problem as communication failure in the communication of the license information request message (M1803), the issued license information recorded in the data storage device 102 when the license information request message (M1803) is first received is sent again. That the server machine 101 receives the license information request message (M1803) more than twice means that there occurs communication failure or the like in the communication of the license information request message (M1803) or a response message (M1804), and that although the client machine 103 sent the license information request message (M1803) once, it has yet to acquire the license information even after performing time-out processing. Therefore, the client machine 103 needs to send the license information request message (M1803) again and the server machine 101 needs to send the issue license information issued when the license information request message (M1803) is first issued.

Moreover, the storage device controlling unit 205 may record the whole response message (M1804) instead of issue license information which is an integral part of the configuration of the response message (M1804). When only issue license information is recorded, for example, processing for preparing the whole response message is required again if the server machine 101 receives the license information request message again. However, by recording the whole of a once-prepared response message, processing for preparing the response message again can be omitted even when the license information request message is received again. This consequently allows an efficient processing in the event of communion failure.

Next, the license information recorded in the data storage device 102 is overwritten by the storage device controlling unit 205 with the server management license information prepared by the license information processing unit 201 as an update of the server management license information.

Finally, the message processing unit 203 prepares a response message (M1804) which includes the issue license information and such response message (M1804) is sent to the client machine 103 via the server-client communication unit 204.

Next, an explanation is provided for the operation illustrated in S1805 in FIG. 18 which takes place in the client machine 103 from when the response message is received to when a commit message is sent. The client-server communication unit 304 receives the response message (M1804) and the message processing unit 303 gives an instruction to the storage device controlling unit 305 to record the issue license information. Note that the storage device controlling unit 305 also records the fact that the license information request has completed normally. Although not illustrated in the diagram, the client machine 103 usually has a content storage unit to store contents, which enables its user to decrypt contents by using a content key included in issue license information and to use contents within the bounds allowed by content usage rules.

The client machine 103 sends a commit message (M1805) to notify the server machine 101 of the completion of recording the requested license information so as to delete the restart ID which is not necessary any more. In other words, the message processing unit 303 prepares the commit message (M1805) which includes the restart ID, the client ID and others to send it to the server machine 101.

Note that the client machine 103 does not have to send a commit message every time the response message is received. Instead, it is possible to send a commit message which includes more than one restart ID by one operation. This is because it leads to an increased amount of communication processing if a commit message (M1805) is sent for each receipt of a response message (M1804). Therefore, it is possible for the client machine 103 to perform a batch commit for ten used restart IDs, for example, for each ten receipts of response messages, which allows an efficient communication.

Next, an explanation is provided for the operation illustrated in S1806 in FIG. 18 which takes place in the server machine 101 from when the commit message is received to when an ACK is sent. The server-client communication unit 204 receives the commit message and the message processing unit 203 judges that it is a commit request.

Then, at the instruction from the message processing unit 203, the storage device controlling unit 205 deletes the set of the restart ID and the client ID which is stored in the data storage device 102 in S1802 and which is specified in the received commit message (M1805). Furthermore, the set of the restart ID and the issue license information stored in the data storage device 102 in S1804 is deleted.

As shown above, when a commit message (M1805) is received, information concerning a specified restart ID is deleted from the data storage device 102 to prevent a harmful effect which occurs by retaining information not necessary any more for a long period of time.

The message processing unit 203 prepares an ACK (M1806) which serves as a response indicating the completion of the commit, and sends it to the client machine 103 via the server-client communication unit 204.

Note that, when there is communication failure in sending a commit message (M1805), the client machine 103 performs time-out processing and sends the commit message (M1805) again. In this case, since the deletion of the issue license information and the restart ID and other processing to be performed in S1806 are yet to be carried out on the server machine 101's part, processing illustrated in S1806 needs to be performed. Meanwhile, when communication failure occurs in sending an ACK (M1806), the client machine 103 performs time-out processing to send a commit message (M1805) again. In this case, since the deletion of the issue license information and the restart ID and other processing illustrated in S1806 are already completed in the server machine 101 when receiving the first commit message (M1805), only the ACK (M1806) is sent out without repeating the processing in S1806.

Next, an explanation is provided for the operation illustrated in S1807 in FIG. 18 which takes place when the client machine 103 receives the ACK. The message processing unit 303 confirms the completion of the commit processing by receiving the ACK (M1806). Then, at the instruction from the message processing unit 303, the storage device controlling unit 305 deletes the set of the unnecessary restart ID included in the commit message (M1805) and the license information request message which is recorded in the data storage device 104. Moreover, the restart ID for which a commit is finished is also deleted.

In this manner, the client machine 103 deletes a record concerning a used restart ID to prevent unnecessary information from being retained in the data storage device 104 for a long period of time.

As described above, with the license information exchange system according to the second embodiment, by generating a restart ID on the client machine 103's part, there is no need for making a request of the server machine 101 for issuing a restart ID and therefore an efficient communication can be realized.

Furthermore, since both a client ID and a restart ID as a unique identifier are used in the communication sequence, uniqueness in the course of communication processing can be easily assured. What is more, an efficient communication can be achieved by performing a batch commit to reduce the number of communications to be performed.

Note that it can also be assumed that the issue of the same restart ID is prevented so as to ensure that a used restart ID can never be reused even after the completion of a series of communication sequences by lengthening data of a restart ID, for example. Therefore, further reduction in the amount of communication processing load can be realized by omitting the processing for recording in the data storage device 104 a restart ID prepared in the restart ID information generating unit 1601. Moreover, by assuring uniqueness of a restart ID, duplication of the restart ID can be surely prevented, even when a user starts such processing as a license information exchange while performing another license information exchange processing.

The Third Embodiment

Next, an explanation is provided for a communication sequence at the time of making a cancellation in the license information exchange system according to the present invention. The third embodiment describes an operation to be performed when the license information which is once requested by the user of the client machine 103 is cancelled, the server machine 101 has already received the license information request message (M1803), and an update is performed for the license information.

Figure 19:
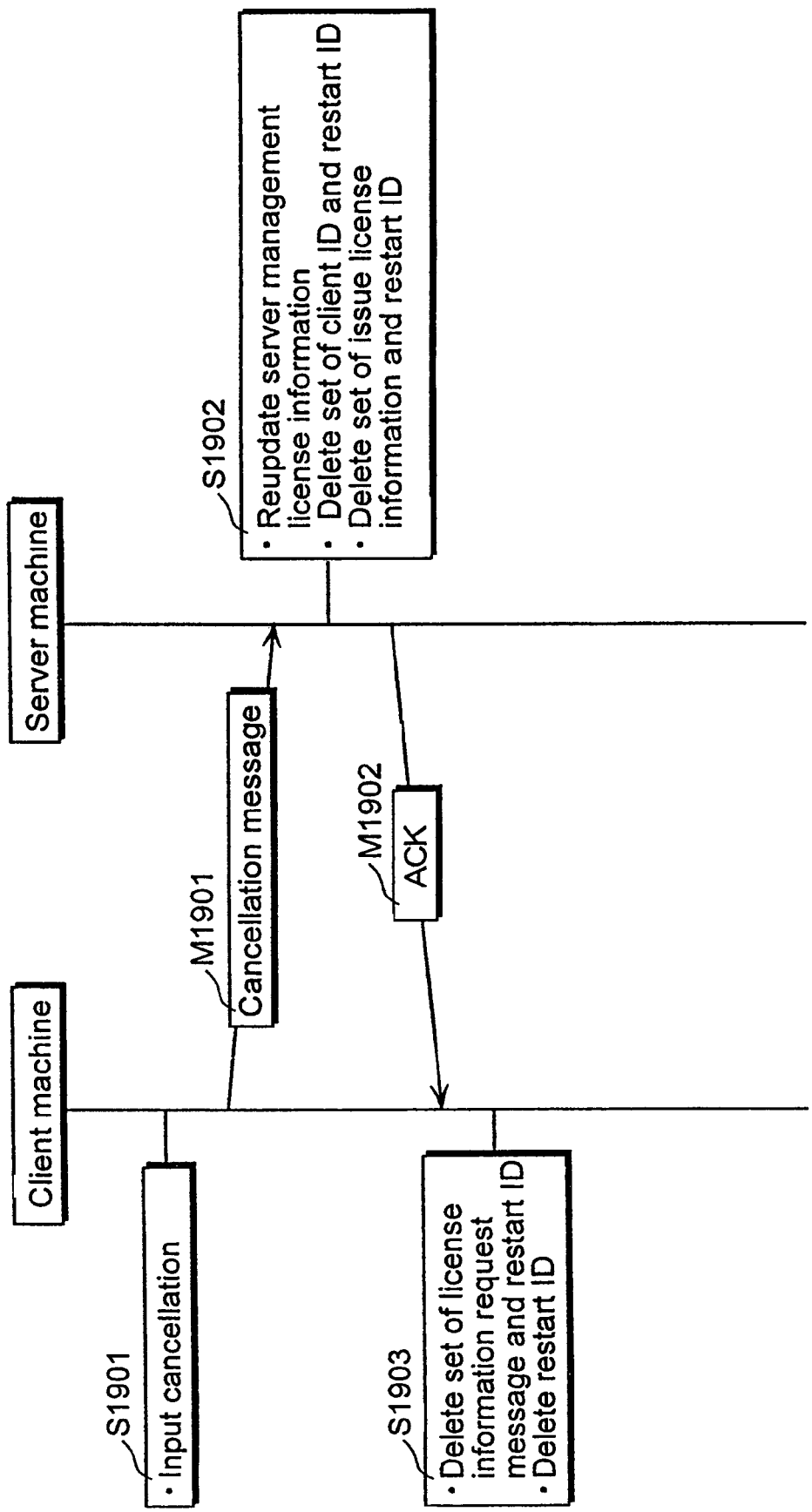
FIG. 19 is a communication sequence diagram showing the case where a user of the client machine makes a cancellation for once-requested license information in the middle of the license information exchange thereof according to the third embodiment.

FIG. 19 is a communication sequence diagram illustrating the case where the user of the client machine 103 according to the third embodiment makes a cancellation of the license information s/he once requested in the middle of the license information exchange. The subsequent paragraphs explain the procedure of such communication sequence.

Note that the third embodiment assumes the case where communication failure occurs in the communication procedure of the response message (M1804) illustrated in FIG. 18. This is because there may occur the case in which the user of the client machine 103 changes his/her mind and cancels a license information exchange request due to the impossibility to conduct such license information exchange for a long period of time even though such user is engaged in the license information exchange communication. What causes a problem when a cancellation is made in the middle of the communication sequence is that the contents of the user license information managed on the part of the server machine 101 is changed although the user does not acquire the license information.

First, an explanation is provided for the operation illustrated in S1901 in FIG. 19 which takes place when the client machine 103 sends a cancellation message to the server machine 101. The user of the client machine 103 inputs a cancellation via the user input unit 302 when making a cancellation of the acquisition of the license information for which s/he once makes the issue request. On the receipt of such cancellation input, the message processing unit 303 prepares a cancellation message (M1901) which includes the restart ID to send it to the server machine 101 via the client-server communication unit 304.

Concerning the operation illustrated in S1902 in FIG. 19 which takes place in the server machine 101 from when the cancellation message is received to when an ACK is sent. After the server-client communication unit 204 receives the cancellation message (M1901), the message processing unit 203 judges that it is a cancellation request for the license information exchange from the user.

Then, the storage device controlling unit 205 reupdates the server management license information stored in the data storage device 102. In other words, since the license information processing unit 201 once updates the license information stored in the data storage device 102 when receiving the license information request message (M1803) for the first time in the processing in S1804 mentioned above (e.g., when the number of times, purchased by the user of the client machine 103 and stored in the data storage device 102 of the server machine 101, for which contents can be played is ten, and when a license information request message is received which requests the contents to be played three times, the number of times for which contents can be played is already updated to seven), the data storage device 102 holds the updated contents of this license information as server management license information.

When the server machine 101 receives the cancellation message (M1901), the license information processing unit 201 reupdates the server management license information (e.g., the already updated number of content playable time of seven times is restored to ten, which is the number before update is performed). To put it another way, the license information processing unit 201 merges an actual right provided by the issue license information recorded in the server management license information with the already updated server management license information.

Then, at the instruction from the message processing unit 203, the storage device controlling unit 205 deletes a set of the restart ID and the client ID to be specified in the cancellation massage from the data storage device 102 and then deletes such set of the restart ID and the issue license information. As just described, when a cancellation message (M1901) is received, the server machine 101 deletes a record concerning a specified restart ID as well as reupdating already updated contents of license information to the original state before update.

The message processing unit 203 sends an ACK (M1902) to the client machine 103 via the server-client communication unit 204 in order to notify the client machine 103 of the completion of a series of processing for cancellation.

Note that since the server machine 101 has yet to receive the cancellation message (M1901) when communication failure or others occurs in the communication of the cancellation message (M1901), the client machine 103 sends such cancellation message (M1901) again after performing time-out processing. Meanwhile, when communication failure occurs in sending the ACK (M1902), the server machine 101 receives the cancellation message (M1901) again, but since a series of processing illustrated in S1902, that is to say, the reupdate of the server management license information, the deletion of the set of the client ID and the restart ID, and the deletion of the set of the restart ID and the issue license information are already performed when the first cancellation message (M1901) is received, there is no need for performing such processing again and therefore, the sending of the ACK (M1902) which serves as a response message indicating the completion of such processing is just required.

Concerning the operation illustrated in S1903 in FIG. 19 which takes place in the client machine 103 when the ACK is received. When the client-server communication unit 304 receives the ACK (M1902), the message processing unit 203 judges that the cancellation of the license information exchange is carried out normally.

Then, the storage device controlling unit 305 deletes from the data storage device 104 the set of the license information request message and the restart ID prepared in S1803 in FIG. 18 as well as the restart ID which becomes unnecessary due to the cancellation.

As described above, in the license information exchange system according to the third embodiment, by allowing the user of the client machine 103 to send a cancellation message (M1901) which includes a restart ID to the server machine 101 and to perform reupdate by merging a right provided with once-issued license information with server management license information, an improper update of the license information which the user is yet to acquire can be prevented.

The Fourth Embodiment

Next, an explanation is provided for a communication sequence when the license information is transferred from the server machine 101 to the client machine 103 according to the present invention. The fourth embodiment is characterized by that the server machine 101 issues a restart ID and that the client machine 103 deletes such restart ID before performing a commit for the completion of the license information exchange to the server machine 101.

FIG. 20 is a communication sequence diagram for the case where the license information is transferred from the server machine 101 to the client machine 103 according to the fourth embodiment.

First, an explanation is provided for the operation illustrated in S2001 in FIG. 20 which takes place when the client machine 103 sends a restart ID issue request message to the server machine 101. In order to request the issue of a restart ID, the user of the client machine 103 inputs a restart ID issue request via the user input unit 302 or others, and the message processing unit 303 creates a restart ID issue request message (M2001), which is then sent to the server machine 101 via the client-server communication unit 304.

Next, an explanation is provided for the operation illustrated in S2002 in FIG. 20 which takes place in the server machine 101 from when the restart ID issue request message is received to when a restart ID is sent. After the server-client communication unit 204 receives the restart ID issue request message (M2001), the message processing unit 203 judges that it is a restart ID issue request and gives an instruction to the communication unique information generating unit 202 to issue a restart ID. Note that since a once-used restart ID is not used in the fourth embodiment, global uniqueness of a restart ID is ensured.

Furthermore, with the server machine 101 providing a restart ID, the number of updates to be performed for the data storage device 104 of the client machine 103 can be reduced as compared to the second embodiment described hereinbefore in which the client machine 103 issues a restart ID and stores it in the data storage device 104.

Next, at the instruction from the message processing unit 203, the storage device controlling unit 205 records the client ID and the restart ID together as a set in the data storage device 102. Furthermore, the message processing unit 203 prepares a restart ID response message (M2002) including the prepared restart ID to send it to the client machine 103 via the server-client communication unit 204.

Concerning the operation illustrated in S2003 and S2004 in FIG. 20, which takes place in the client machine 103 from when the restart ID response message is received to when a license information request message is sent. When the client-server communication unit 304 receives the restart ID response message (M2002), the message processing unit 303 judges that it is a restart ID and gives an instruction to the storage device controlling unit 305 to record such restart ID. Following this instruction, the storage device controlling unit 305 has the data storage device 104 memorize the restart ID (S2003), and the message processing unit 303 prepares a license information request message which selects usage rules of contents requested by the user (S2004).

Then, the prepared license information request message (M2003) is sent to the server machine 101 together with the restart ID via the client-server communication unit 304.

Next, an explanation is provided for the operation illustrated in S2005 in FIG. 20 which takes place in the server machine 101 from when the license information request message is received to when license information is sent. When the server-client communication unit 204 receives the license information request message (M2003), the message processing unit 203 judges that it is a license information request and gives an instruction to the license information processing unit 201 to issue license information. Note that an explanation for the license information issue is the same as the above-mentioned S1804 and therefore that a concrete explanation for it is omitted.

Note that there may occur a case where the contents of license information requested by the user can vary when it is first requested and when it is requested from the second time onward. It is possible, for example, that even when the number of times for which the user requests to play contents is three when the first request is made, such number can be four when the next request is made due to processing-related reasons on the user's part which result in a change in the user's selection. The fourth embodiment does not require the contents of a license information request message (M2003) to be finalized at the start of the communication sequence and therefore, a different license information request message (M2003) can be sent with the same restart ID.

In other words, by using the same restart ID, when a license information request message to be identified by a restart ID is received again, it is possible to prepare issue license information according to a new license information request message by merging the contents of an already issued license information with server management license information so as to restore such contents to the state before update. Meanwhile, since a restart ID is deleted on the receipt of issue license information in the server machine 103 when license information is received normally, a license information request message using the same restart ID is not to be sent twice after the license information exchange, which consequently ensures a proper license information exchange.

Then, the license information recorded in the data storage device 102 is overwritten by the storage device controlling unit 205 with the updated server management license information prepared by the license information processing unit 201 as an update of the server management license information.

Finally, the message processing unit 203 creates a response message (M2004) which includes the issue license information and sends it to the client machine 103 via the server-client communication unit 204.

Concerning the operation illustrated in S2006 in FIG. 20 which takes place in the client machine 103 when the license information is received, after the server communication unit 304 receives the response message (M2004), the message processing unit 303 judges that it is issue license information. Then, the message processing unit 303 gives an instruction to the storage device controlling unit 305 to store it in the data storage device 104.

Then, the client machine 103 deletes the restart ID-related record when recording the issue license information. As just described, the deletion of a record concerning a restart ID serving as an identifier is made on the part in which the final update of license information is performed in the communication of a license information exchange when such update is carried out. This allows information concerning an unnecessary restart ID to be deleted at the earliest stage after acquiring license information requested by the user of the client machine 103 and results in the prevention of a wrong license information exchange as well as in the alleviation of a harmful effect which occurs by storing such unnecessary restart ID in the data storage device 104 for a long period of time.

Next, an explanation is provided for the operation illustrated in S2007 in FIG. 20 which takes place in the client machine 103 when a commit message is sent. Since the deletion of the restart ID and the storage of the issue license information are carried out concurrently in the client machine 103 (S2006), there is usually no recorded restart ID in the data storage device 104. Therefore, the message processing unit 303 confirms that there is no restart ID recorded in the data storage device 104.

After such confirmation is made, the message processing unit 303 prepares a commit message (M2005) and performs a commit without specifying any restart ID. It is therefore possible for the server machine 101 to perform a batch commit for a plurality of restart IDs and issue license information managed together with a client ID, without performing a commit on a per-restart ID basis. As a result, the amount of processing performed in the communication process can be reduced and a communication with an increased efficiency is realized.

With regard to the operation illustrated in S2008 in FIG. 20 which takes place in the server machine 101 when the commit message is received, after the server-client communication unit 204 receives the commit message (M2005), the message processing unit 203 judges that it is a commit request message. Then, by using the client ID of the client machine 103, the message processing unit 203 gives an instruction to the storage device controlling unit 205 to delete the set of such client ID and the restart ID, as well as the set of such restart ID and the issue license information. Following this instruction, the storage device controlling unit 205 deletes such data from the data storage device 102.

Note that in a case where a commit message (M2005) is sent from the client machine 103 per a specified period of time and where no license information exchange is carried out during such period, it is possible that there exists no restart ID, issue license information or others in the server machine 101 to be deleted.

As described above, in the license information exchange system according to the fourth embodiment, with the server machine 101 providing a restart ID, the number of updates to be performed for the data storage device 104 can be reduced as compared to the second embodiment described hereinbefore in which the client machine 103 issues a restart ID and stores it in the data storage device 104.

Furthermore, by using the same restart ID, when a license information request message (M2003) to be identified by a restart ID is received again, it is possible to prepare issue license information according to a new license information request message (M2003) by again updating the already updated server management license information to the state before update.

Moreover, since the client machine 103 deletes a restart ID-related record at the time of recording issue license information, it is possible to delete information concerning an unnecessary restart ID at the earliest stage after the acquisition of license information requested by the user of the client machine 103. This consequently results in the prevention of a wrong license information exchange, as well as in the alleviation of a harmful effect which occurs by storing such unnecessary restart ID in the data storage device 104 for a long period of time.

What is more, it is possible for the client machine 103 to carry out an increasingly efficient communication by performing a batch commit without specifying any restart ID.

The Fifth Embodiment

Next, an explanation is provided for another embodiment according to the present invention. The fifth embodiment is intended to explain a communication sequence in the case where license information which is once acquired by the client machine 103 is returned to the server machine 101. The present embodiment is characterized by an implicit commit performed for information used in a previous communication.

Figure 21:
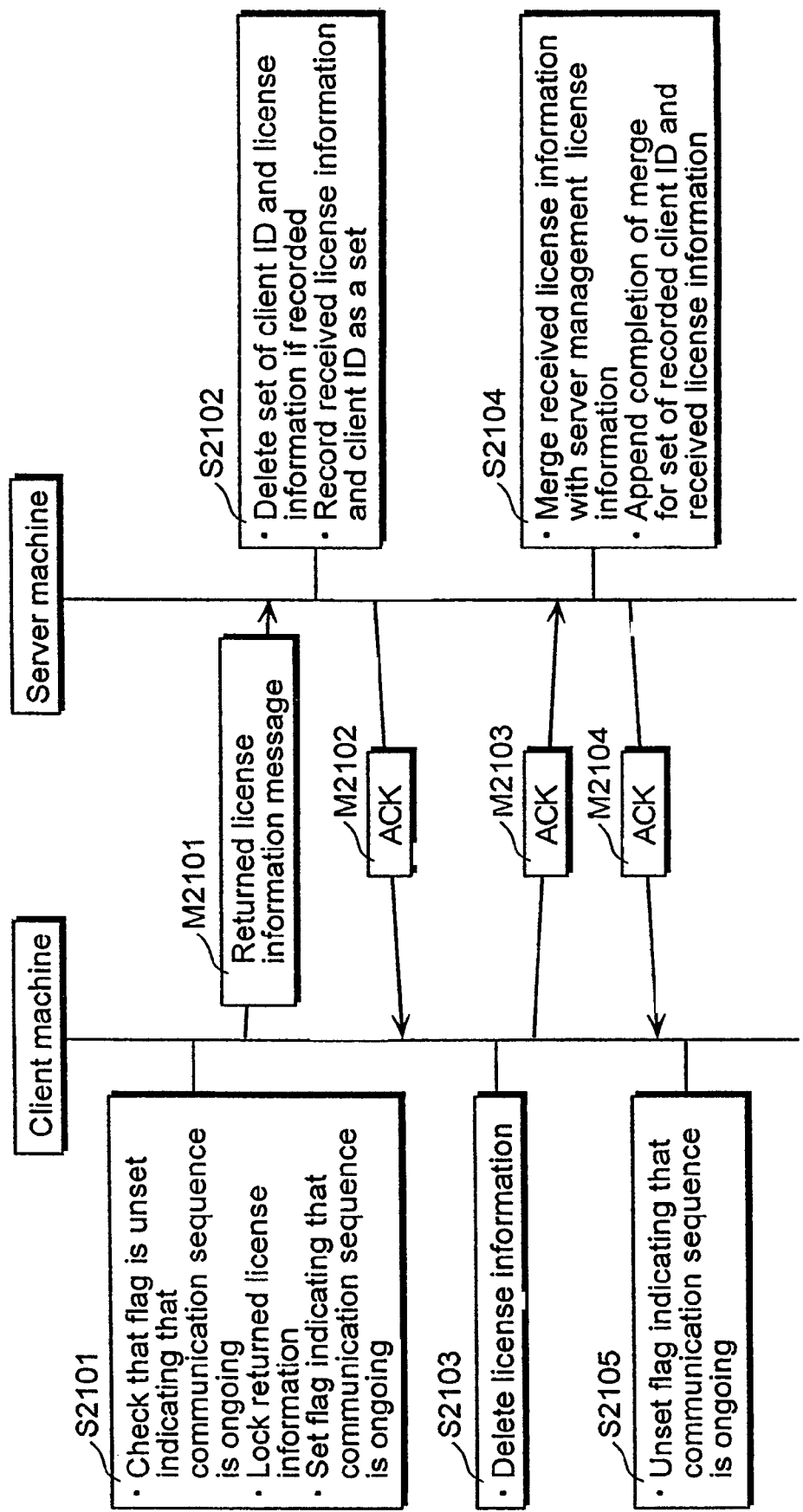

FIG. 21 is a communication sequence diagram for the case where the license information is returned from the client machine 103 to the server machine 101 according to the fifth embodiment. This communication procedure is comprised of communication messages described below.

First, an explanation is provided for the operation illustrated in S2101 in FIG. 21 which takes place in the client machine 103 in sending a returned license information message at the start of the communication sequence. In a state in which a series of communications are completed, the client machine 103 checks that a flag is unset which indicates that the communication sequence is ongoing.

Next, the message processing unit 303 locks the license information to be returned so as to make it unusable. Locking license information before providing an identifier for the communication sequence in the process of license information transfer prevents such license information from being used by others.

Then, after creating a returned license information message (M2101) which includes the license information to be returned and setting a flag indicating that the communication sequence is ongoing, the message processing unit 303 sends such returned license information message (M2101) to the server machine 101 via the client-server communication unit 304.

Next, an explanation is provided for the operation illustrated in S2102 in FIG. 21 which takes place in the server machine 101 from when the returned license information message is received to when an ACK is sent. When the server-client communication unit 204 receives the returned license information message (M2101), the message processing unit 203 checks the client ID included in the returned license information message, and if there is the set of the client ID and the license information in the data storage device 102 recorded in a previous return communication, the storage device controlling unit 205 deletes such set of information. In other words, in the fifth embodiment, by using information concerning a client ID and license information at the start of the communication sequence in the server machine 101, it is possible to perform an implicit commit for information of a previous communication sequence so as to delete a record related to the previous communication.

Then, the storage device controlling unit 205 records the license information and the client ID included in the received returned license information message (M2101) together as a set in the data storage device 102.

Note that the user does not exchange more than one license information at a time for most cases and therefore s/he usually starts exchanging another license information after one license information exchange is completed. Therefore, as presented in the fifth embodiment, by allowing only one communication sequence to be executed at a time between a specified server machine 101 and a client machine 103, only a client ID is required as an identifier.

Then, the message processing unit 203 prepares an ACK (M2102) which serves as a response indicating that the license information to be returned is received and sends it to the client machine 103 via the server-client communication unit 204.

Regarding the operation illustrated in S2103 in FIG. 21 which takes place in the client machine 103 from when the ACK (M2102) is received to when an ACK (M2103) is sent. When the client-server communication unit 304 receives the ACK (M2102), the message processing unit 303 judges that the license information is returned normally and then the storage device controlling unit 305 deletes the returned license information from the data storage device 104.

The message processing unit 303 sends the ACK (M2103), which serves as a response indicating that the deletion of returned license information is completed, to the server machine 101 via the client-server communication unit 304.

Next, an explanation is provided for the operation illustrated in S2104 in FIG. 21 which takes place on the part of the server machine 101 from when the ACK (M2103) is received to when an ACK (M2104) is sent. When the server-client communication unit 204 receives the ACK (M2103), the message processing unit 203 judges that the deletion of the license information is completed in the client machine 103. Then, the license information processing unit 201 merges the license information recorded in the data storage device 102 in S2102 with the server management license information and appends that the merge is completed to the recorded set of the client ID and the license information.

Then, the message processing unit 203 prepares the ACK (M2104), which serves as a response indicating that the merge of returned license information is completed, and sends it to the client machine 103 via the server-client communication unit 204.

Note that if the server machine 101 receives the ACK (M2103) again due to communication failure or others, only the processing for sending the ACK (M2104) is performed with the processing illustrated in S2104 being skipped.

Concerning the operation illustrated in S2105 in FIG. 21 which takes place in the client machine 103 after the ACK (M2104) is received, when receiving the ACK (M2104), the client machine 103 unsets the flag set in S2101 indicating that the communication sequence is ongoing and completes a series of communications for returning the license information from the client machine 103 to the server machine 101.

As described above, in the license information exchange system according to the fifth embodiment, by allowing only one communication sequence to be executed at a time between specified machines, only a client ID is required as an identifier. Therefore, there is no need for using a restart ID as an identifier, meaning that its issue and recording is unnecessary.

Moreover, by using a client ID at the start of the communication sequence in the server machine 101, it is possible to perform an implicit commit for information of a previous communication sequence so as to delete a record related to a set of a client ID and license information in a previous communication.

The Sixth Embodiment

Next, another embodiment according to the present invention is explained with reference to FIG. 22, which is a communication sequence diagram concerning the use of contents between the client machine 103 and the server machine 101.

Note that the sixth embodiment realizes an increased efficiency in a series of processing presented from the first to the fifth embodiments hereinbefore, in which the number of writings to the data storage devices 102 and 104, which are flash memories equipped with the client machine 103 and the server machine 101, is reduced in a series of communications in a license information exchange system. The sixth embodiment is characterized by that a restart ID issue request is not to be made by the use of a restart ID generated in the client machine 103 and that an implicit commit is performed at the termination of the use of contents in the client machine 103. Note that a case is assumed where the number of times for which the user can play contents is predetermined.

First, an explanation is provided for the operation illustrated in S2201 in FIG. 22 which takes place in the server machine 103 before a content key request message is sent. At the instruction from the message processing unit 303, the restart ID information generating unit 1601 issues a restart ID. The message processing unit 303 creates a content key request message (M2201) which includes the generated restart ID, a license information ID serving as an ID to identify license information in the server machine 101, i.e., the terminal to which a request is made, and an action ID indicating an action of contents requested by the user of the client machine 103, and sends this request message to the server machine 101 via the client-server communication unit 304.

Note that the storage device controlling unit 305 logs a content 110 key request message in the data storage device 104 and records the usage amount of requested contents following the instruction from the message processing unit 303, but since contents are yet to be used in S2201, such usage amount is 0.

As just described, by sending a restart ID generated in the client machine 103 and such information as a license information ID required for transferring license information together in a content key request message (M2201), the client machine 103 does not have to send a restart ID issue request message to the server machine 101, which consequently results in a decreased number of communications.

Furthermore, in the sixth embodiment, since the recording of the generated restart ID is carried out together with the log recording and the usage amount recording, the number of writings to the date storage device 104 can be reduced.

Next, an explanation is provided for the operation illustrated in S2202 in FIG. 22 which takes place in the server machine 101 after the request for acquiring a content key is received. When the server-client communication unit 204 receives the content key request message (M2201), the license information processing unit 201 searches for the license information ID from the data storage device 102 and makes a judgment on content usage rules, if such license information is found.

If such content usage rules satisfy user requests, the license information processing unit 201 prepares license information which includes a content key used to decrypt contents, rules to control the execution of actions allowed to be performed for user-specified contents, rules which are pieces of information indicating the usage expiring date/possible usage number and others. This license information is locked in the message processing unit 203, which then creates a content key response message (M2202) made up of such license information and the client ID. Furthermore, following the instruction from the message processing unit 203, the storage device controlling unit 205 records the update of the usage number and the received restart ID.

Finally, the message processing unit 203 sends the content key response message (M2202) to the client machine 103 via the server-client communication unit 204.

Concerning the operation illustrated in S2203 in FIG. 22 which takes place in the client machine 103 after the content key response message (M2202) is received, after the client-server communication unit 304 receives the content key response message (M2202), the message processing unit 303 makes a judgment on the content key and rules which are pieces of information indicating the usage expiring date, the possible usage number and others included in the content key response message (M2202).

Then, at the instruction from the message processing unit 303, the storage device controlling unit 305 performs a log update of the data storage device 104 (content playback starts) and updates the usage amount to the maximum amount allowed (for example, if three hours of content usage is allowed according to a content key response message, the usage amount is updated to three hours).

In S2204 in FIG. 22, by following allowed content usage rules, the user of the client machine 103 decrypts the contents with the contests key so as to start the playback of such contents (S2204). Then, by the user stopping the playback of such contents, the content usage terminates (S2205).

Next, an explanation is provided for the operation illustrated in S2206 in FIG. 22 which takes place in the client machine 103 in sending a content key usage termination message. At the termination of content playback by the user (S2205), the message processing unit 303 creates a content key usage termination message (M2203) which includes the restart ID and the content usage amount (e.g., actual playback hour is one hour) and sends it to the server machine 101 via the client-server communication unit 304.

Note that at the instruction from the message processing unit 303, the storage device controlling unit 305 logs the sending of the content key usage termination message in the data storage device 104 and updates the usage amount to the actual amount of usage (e.g., actual playback hour is one hour).

Note that the client machine 103 needs to send a commit message after the processing in S2206 in conventional systems, but since an implicit commit is also performed in the content key usage termination message (M2203) in the sixth embodiment, the sending of a commit message can be omitted, which leads to a reduced amount of processing in the communication.

Next, an explanation is provided for the operation illustrated in S2207 in FIG. 22 which takes place in the server machine 101 after the content key usage termination message is received. The server-client communication unit 204 receives the content key usage termination message (M2203), and then at the instruction from the message processing unit 203, the license information processing unit 201 unlocks the license information sent in S2202 and updates it. Then, following the instruction from the message processing unit 203, the storage device controlling unit 205 deletes the restart ID from the data storage device 102.

Next, the message processing unit 203 prepares an ACK (M2204) which serves as a response indicating that the use of a content key is terminated and sends it to the client machine 103 via the server-client communication unit 204.

Concerning the operation illustrated in S2208 in FIG. 22 which takes place in the client machine 103 after the ACK (M2204) is received, the message processing unit 303 of the client machine 103 gives an instruction to the storage device controlling unit 305 to delete the restart ID prepared in S2201 and then such restart ID is deleted from the data storage device 104.

As described above, in the license information exchange system according to the sixth embodiment, the client machine 103 generates a restart ID and an implicit commit is performed in a content key usage termination message (M2203). Therefore, it is not necessary for the client machine 103 to send a restart ID issue request message or a commit message, which consequently results in reduced communication processing load. Moreover, since the number of writings to the data storage device 102 or 104 is reduced to three times before content playback starts (S2201~S2203) and three times after content playback stops (S2206~S2208), an efficient use is realized of the data storage devices 102 and 104 which can be written only for a limited number of times.

The Seventh Embodiment

Figure 23:
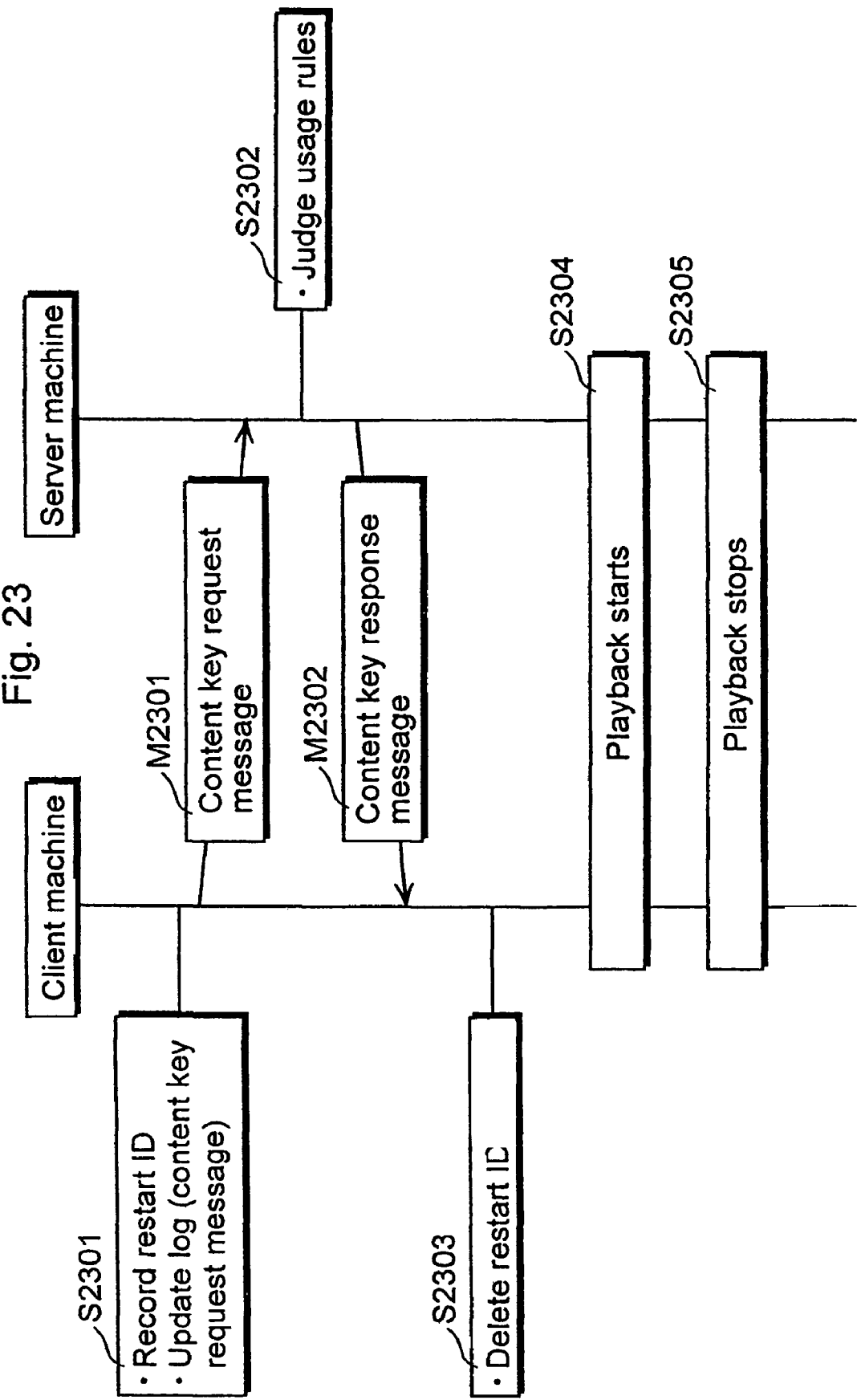
FIG. 23 is a communication sequence diagram concerning the license information exchange system according to the seventh embodiment.

Next, the communication sequence of another embodiment is explained. FIG. 23 is a communication sequence diagram illustrating a license information exchange system according to the seventh embodiment. The present embodiment assumes the case where contents is played back for an unlimited number of times and is characterized by that the server machine 101 does not perform any writings to the data storage device 102.

First, an explanation is provided for the operation illustrated in S2301 in FIG. 23 which takes place in the client machine 103 before a content key request message is sent. The restart ID information generating unit 1601 issues a restart ID and prepares a content key request message (M2301) as in the above-mentioned processing in S2201.

With regard to the operation illustrated in S2302 in FIG. 23 which takes place in the server machine 101 after the content key request message is received, when receiving the content key request message (M2301), the server machine 101 makes a judgment on content usage rules. Then, based on the result of such judgment, the message processing unit 203 sends a content key response message (M2302) to the client machine 103 via the server-client communication unit 204.

Note that since contents can be played for an unlimited number of times in the seventh embodiment and therefore, no update of the usage number or the recording of a restart ID is carried out in the server machine 101, neither writing to the data storage device 102 nor locking of license information is to be performed.

Next, the operation illustrated in S2303 in FIG. 23 which takes place after the content key response message is received. When the client-server communication unit 304 receives the content key response message (M2302), the storage device controlling unit 305 deletes the restart ID issued in S2301 from the data storage device 104, following the instruction from the message processing unit 303. For this reason, the restart ID which is no longer required is deleted at the completion of the license information exchange.

Then, after acquiring the content key from the content key response message (M2302) and making a judgment on content usage rules and others, the client machine 103 starts playing back the contents (S2304), and then the playback stops when the user terminates the use of the contents (S2305).

Therefore, in the license information exchange system according to the seventh embodiment, since the number of writings to the data storage device 104 in a series of communication sequences for a license information exchange can be minimized to two (S2301 and S2303) and contents can be played back for an unlimited number of times, there is no need for performing such writings to the data storage device 102 as an update of the possible usage number and the recording of a received restart ID.

Meanwhile, it should be understood that the above-mentioned embodiments are provided just as examples, meaning that the present invention is not restricted to each communication sequence presented in such embodiments and therefore, that the present invention is applicable within any feasible range.

INDUSTRIAL APPLICABILITY

The license information exchange system of the present invention is suited for use as a system for distributing contents from a server to a terminal machine via a network by the use of a personal computer with communications capability.

What is claimed is:

1. A rights information transmission system comprising a server device and a client device, the rights information transmission system being for transmitting rights information indicating usage rights of a content, from the server device to the client device, via a communication network, wherein the server device includes:
a device unique information receiving unit operable to receive, from the client device, device unique information that is unique to the client device;
an identification information receiving unit operable to receive, from the client device, communication identification information for (i) identifying a series of communications, with the client device, for transmitting the rights information, and (ii) confirming a success or failure of a communication of the transmission of the rights information;
a first data storing unit including a memory operable to store the received communication identification information transmitted between the server device and the client device, the communication identification information being stored in association with the received device unique information of the client device at least until the rights information is transmitted to the client device;

a request receiving unit operable to receive, from the client device and as a rights request, communication identification information, device unique information, and request information concerning rights information for which acquisition is requested by the client device;

a generating unit operable to (i) respectively compare the communication identification information received by the request receiving unit and the device unique information received by the request receiving unit with the communication identification information received by the identification information receiving unit and stored in advance in the first data storing unit and the device unique information received by the device unique information receiving unit and stored in advance in the first data storing unit, and (ii) generate the rights information according to the request information received by the request receiving unit, when the comparison indicates that the communication identification information received by the request receiving unit and the device unique information received by the request receiving unit respectively match the communication identification information received by the identification information receiving unit and stored in advance in the first data storing unit and the device unique information received by the device unique information receiving unit and stored in advance in the first data storing unit;

a first transmission unit operable to transmit, to the client device, a response message including the generated rights information; and a first commit unit operable to (i) receive, from the client device, a commit message indicating a completion of the client device storing the generated rights information transmitted by the server device, (ii) update the communication identification information that is (a) received by the identification information receiving unit, (b) stored by the first data storing unit, and (c) determined, by the generating unit, to match the communication identification information received by the request receiving unit, when the commit message is received, and (iii) transmit, to the client device, an acknowledgment message indicating receipt of the commit message, and wherein the client device includes:

a first storing unit operable to store the rights information;

a second storing unit operable to store the device unique information that is unique to the client device and is transmitted in advance to the device unique information receiving unit or is transmitted to the request receiving unit;

a device unique information sending unit operable to send the device unique information to the device unique information receiving unit of the server device;

a request information generating unit operable to generate the request information;

a communication identification information generating unit operable to generate the communication identification information to be transmitted to the device unique information receiving unit of the server device in advance or to the request receiving unit of the server device;

a second transmission unit operable to transmit, to the request receiving unit of the server device and as the rights request, the request information, the communication identification information generated by the communication identification generating unit, and the device unique information;

a second data storing unit operable to store the communication identification information generated by the communication identification generating unit at least until the rights information is received from the server device;

a receiving unit operable to receive, from the server device, the transmitted response message including the generated rights information;

an updating unit operable to cause the first storing unit to store the generated rights information included in the received response message when the receiving unit receives the response message; and a second commit unit operable to (i) generate and transmit the commit message to the server device when the updating unit completes the storing of the generated rights information in the first storing unit, and (ii) update the communication identification information that (a) was received in advance by the identification information receiving unit, (b) is stored by the second data storing unit, and (c) is determined, by the generating unit of the server device, to match the communication identification information received by the request receiving unit of the server device, the second commit unit performing the update of the communication identification information when the server device receives the commit message, and the acknowledgment message, indicating the receipt of the commit message, is subsequently received from the server device, such that the updated communication identification information is transmitted, to the request receiving unit of the server device when the second transmission unit of the client device subsequently transmits another rights request, as the communication identification information included in the another rights request along with the device unique information and the request information.

2. A rights information transmission method for transmitting rights information indicating usage rights of a content, the rights information being transmitted from a server device to a client device via a communication network, the rights information transmission method comprising:

steps performed by the server device including:

a device unique information receiving step of receiving, from the client device, device unique information that is unique to the client device;

an identification information receiving step of receiving, from the client device, communication identification information for (i) identifying a series of communications, with the client device, for transmitting the rights information and (ii) confirming a success or failure of a communication of the transmission of the rights information;

a first data storing step of storing, in a first data storing unit, the received communication identification information transmitted between the server device and the client device, the communication identification information being stored in association with the received device unique information of the client device at least until the rights information is transmitted to the client device;

a request receiving step of receiving, from the client device and as a rights request, communication identification information, device unique information, and request information concerning rights information for which acquisition is requested by the client device;

a generating step of (i) respectively comparing the communication identification information received by the request receiving step and the device unique information received by the request receiving step with the communication identification information received by the identification information receiving step and stored in advance by the first data storing step and the device unique information received by the device unique information receiving step and stored in advance by the first data storing step, and (ii) generating the rights information according to the request information received by the request receiving step, when the comparing indicates that the communication identification information received by the request receiving step and the device unique information received by the request receiving step respectively match the communication identification information received by the identification information receiving step and stored by the first data storing step and the device unique information received by the device unique information receiving step and stored in advance by the first data storing step;

a first transmission step of transmitting, to the client device, a response message including the generated rights information; and a first commit step of (i) receiving, from the client device, a commit message indicating a completion of the client device storing the generated rights information transmitted by the server device, (ii) updating the communication identification information that is (a) received by the identification information receiving step, (b) stored by the first data storing unit, and (c) determined, by the generating step, to match the communication identification information received by the request receiving step, when the commit message is received, and (iii) transmitting, to the client device, an acknowledgment message indicating receipt of the commit message; and steps performed by the client device, using a first storing unit that stores the rights information and using a second storing unit that stores the device unique information that is unique to the client device and is received in advance by the device unique information receiving step or is received by the request receiving step, including:

a device unique information sending step of sending the device unique information to be received by the device unique information receiving step performed by the server device;

a request information generating step of generating the request information;

a communication identification information generating step of generating the communication identification information to be transmitted to the server device (i), in advance, via the device unique information receiving step, or (ii) via the request receiving step;

a second transmission step of transmitting, to be received by the request receiving step performed by the server device and as the rights request, the request information, the communication identification information generated by the communication identification information generating step, and the device unique information;

a second data storing step of storing, in a second data storing unit, the communication identification information generated by the communication identification information generating step at least until the rights information is received from the server device;

a receiving step of receiving, from the server device, the transmitted response message including the generated rights information;

an updating step of causing the first storing unit to store the generated rights information included in the received response message when the response message is received by the receiving step; and a second commit step of (i) generating and transmitting, to the server device, the commit message when the storing of the generated rights information by the updating step is completed, and (ii) updating the communication identification information that (a) was received in advance by the identification information receiving step, (b) is stored by the second data storing unit, and (c) is determined, by the generating step of the server device, to match the communication identification information received by the request receiving step of the server device, the second commit step performing the updating of the communication identification information when the server device receives the commit message, and the acknowledgment message, indicating the receipt of the commit message, is subsequently received from the server device, such that the updated communication identification information is transmitted, to be received by the request receiving step performed by the server device when the second transmission step performed by the client device subsequently transmits another rights request, as the communication identification information included in the another rights request along with the device unique information and the request information.

3. A non-transitory computer-readable recording medium having a program recorded thereon, the program for transmitting rights information indicating usage rights of a content, the rights information being transmitted from a server device to a client device via a communication network, and the program causing a computer to execute a method comprising:

steps performed by the server device including:

a device unique information receiving step of receiving, from the client device, device unique information that is unique to the client device;

an identification information receiving step of receiving, from the client device, communication identification information for (i) identifying a series of communications, with the client device, for transmitting the rights information and (ii) confirming a success or failure of a communication of the transmission of the rights information;

a first data storing step of storing, in a first data storing unit, the received communication identification information transmitted between the server device and the client device, the communication identification information being stored in association with the received device unique information of the client device at least until the rights information is transmitted to the client device;

a request receiving step of receiving, from the client device and as a rights request, communication identification information, device unique information, and request information concerning rights information for which acquisition is requested by the client device;

a generating step of (i) respectively comparing the communication identification information received by the request receiving step and the device unique information received by the request receiving step with the communication identification information received by the identification information receiving step and stored in advance by the first data storing step and the device unique information received by the device unique information receiving step and stored in advance by the first data storing step, and (ii) generating the rights information according to the request information received by the request receiving step, when the comparing indicates that the communication identification information received by the request receiving step and the device unique information received by the request receiving step respectively match the communication identification information received by the identification information receiving step and stored by the first data storing step and the device unique information received by the device unique information receiving step and stored in advance by the first data storing step;

a first transmission step of transmitting, to the client device, a response message including the generated rights information; and a first commit step of (i) receiving, from the client device, a commit message indicating a completion of the client device storing the generated rights information transmitted by the server device, (ii) updating the communication identification information that is (a) received by the identification information receiving step, (b) stored by the first data storing unit, and (c) determined, by the generating step, to match the communication identification information received by the request receiving step, when the commit message is received, and (iii) transmitting, to the client device, an acknowledgment message indicating receipt of the commit message; and steps performed by the client device, using a first storing unit that stores the rights information and using a second storing unit that stores the device unique information that is unique to the client device and is received in advance by the device unique information receiving step or is received by the request receiving step, including:

a device unique information sending step of sending the device unique information to be received by the device unique information receiving step performed by the server device;

a request information generating step of generating the request information;

a communication identification information generating step of generating the communication identification information to be transmitted to the server device (i), in advance, via the device unique information receiving step, or (ii) via the request receiving step;

a second transmission step of transmitting, to be received by the request receiving step performed by the server device and as the rights request, the request information, the communication identification information generated by the communication identification information generating step, and the device unique information;

a second data storing step of storing, in a second data storing unit, the communication identification information generated by the communication identification information generating step at least until the rights information is received from the server device;

a receiving step of receiving, from the server device, the transmitted response message including the generated rights information;

an updating step of causing the first storing unit to store the generated rights information included in the received response message when the response message is received by the receiving step; and a second commit step of (i) generating and transmitting, to the server device, the commit message when the storing of the generated rights information by the updating step is completed, and (ii) updating the communication identification information that (a) was received in advance by the identification information receiving step, (b) is stored by the second data storing unit, and (c) is determined, by the generating step of the server device, to match the communication identification information received by the request receiving step of the server device, the second commit step performing the updating of the communication identification information when the server device receives the commit message, and the acknowledgment message, indicating the receipt of the commit message, is subsequently received from the server device, such that the updated communication identification information is transmitted, to be received by the request receiving step performed by the server device when the second transmission step performed by the client device subsequently transmits another rights request, as the communication identification information included in the another rights request along with the device unique information and the request information.

* * * * *